US011885105B2

(12) United States Patent
Nagai et al.

(10) Patent No.: US 11,885,105 B2
(45) Date of Patent: Jan. 30, 2024

(54) HYDRAULIC CONTROL DEVICE FOR WORK MACHINE

(71) Applicant: KOBELCO CONSTRUCTION MACHINERY CO., LTD., Hiroshima (JP)

(72) Inventors: Masaki Nagai, Hiroshima (JP); Koji Ueda, Hiroshima (JP); Yuichiro Fujita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 17/619,666

(22) PCT Filed: Jun. 15, 2020

(86) PCT No.: PCT/JP2020/023410

§ 371 (c)(1),
(2) Date: Dec. 16, 2021

(87) PCT Pub. No.: WO2020/262073

PCT Pub. Date: Dec. 30, 2020

(65) Prior Publication Data

US 2022/0356679 A1 Nov. 10, 2022

(30) Foreign Application Priority Data

Jun. 28, 2019 (JP) ................................ 2019-121719

(51) Int. Cl.
*E02F 9/22* (2006.01)
*F15B 11/17* (2006.01)

(52) U.S. Cl.
CPC .......... *E02F 9/2242* (2013.01); *E02F 9/2282* (2013.01); *E02F 9/2285* (2013.01);
(Continued)

(58) Field of Classification Search
CPC ..... E02F 9/2239; E02F 9/2242; E02F 9/2282; E02F 9/2285; E02F 9/2292; E02F 9/2296;
(Continued)

(56) References Cited

U.S. PATENT DOCUMENTS 5,052,179 A * 10/1991 Fujii .................... E02F 9/2292 60/444
5,692,377 A * 12/1997 Moriya ................ E02F 9/2242 60/427
(Continued)

FOREIGN PATENT DOCUMENTS

CN 107208675 A 9/2017
EP 1 146 175 A1 10/2001
(Continued)

OTHER PUBLICATIONS

Combined Chinese Office Action and Search Report dated Jul. 5, 2022 in Chinese Patent Application No. 202080042153.6 (with unedited computer generated English Translation of Office Action only), 14 pages.
(Continued)

*Primary Examiner* — Michael Leslie
(74) *Attorney, Agent, or Firm* — Oblon, McClelland, Maier & Neustadt, L.L.P.

(57) ABSTRACT

A hydraulic drive apparatus includes a flow-path selector valve and a flow-path switching control unit that operates the valve. The flow-path selector valve has a first position for a single operation state and a second position for a combined operation state, configured to, at the first position, form a first flow path connected to a first pump, a second flow path connected to a second pump, and a connecting flow path providing communication between the first flow path and the second flow path. When a driving state of a work actuator is deviated from an allowable range in the combined operation state, the flow-path switching control unit reduces an opening area of the connecting flow path as compared with that when the driving state is within the allowable range.

16 Claims, 8 Drawing Sheets

(52) U.S. Cl.
CPC .......... *E02F 9/2292* (2013.01); *E02F 9/2296* (2013.01); *F15B 11/17* (2013.01); *F15B 2211/20546* (2013.01); *F15B 2211/3058* (2013.01); *F15B 2211/30595* (2013.01); *F15B 2211/3116* (2013.01)

(58) Field of Classification Search
CPC ............ F15B 11/17; F15B 2211/20546; F15B 2211/3058; F15B 2211/30595; F15B 2211/3116
See application file for complete search history.

(56) References Cited

U.S. PATENT DOCUMENTS

| | | | | |
|---|---|---|---|---|
| 9,145,660 | B2 * | 9/2015 | Peterson | F15B 11/0423 |
| 10,233,614 | B2 * | 3/2019 | Isogai | F16K 27/003 |
| 11,542,963 | B2 * | 1/2023 | Ueda | E02F 9/2253 |
| 2006/0265915 | A1 | 11/2006 | Toji et al. | |
| 2014/0283915 | A1 | 9/2014 | Ma et al. | |
| 2018/0044890 | A1 | 2/2018 | Hijikata et al. | |
| 2022/0356675 | A1 * | 11/2022 | Nagai | E02F 9/2203 |

FOREIGN PATENT DOCUMENTS

| | | | |
|---|---|---|---|
| EP | 2 466 017 | A1 | 6/2012 |
| EP | 2 489 883 | A1 | 8/2012 |
| JP | 8-189061 | A | 7/1996 |
| JP | 2004-100847 | A | 4/2004 |
| JP | 2006-329341 | A | 12/2006 |

OTHER PUBLICATIONS

International Search Report dated Sep. 1, 2020 in PCT/JP2020/023410 filed on Jun. 15, 2020, 2 pages.
Extended European Search Report dated May 31, 2022 in European Patent Application No. 20831882.4, 9 pages.

* cited by examiner

HYDRAULIC CONTROL DEVICE FOR WORK MACHINE

TECHNICAL FIELD

The present invention relates to a hydraulic control apparatus for controlling the motion of a work machine.

BACKGROUND ART

A conventional hydraulic control apparatus is described, for example, in Patent Document 1. The apparatus described in FIG. 1 of the above document includes a first pump, a second pump, a flow-path selector valve for switching a flow path of hydraulic fluid discharged from the first and second pumps (a straight traveling valve in the document), and a plurality of hydraulic actuators. The plurality of hydraulic actuators include a work actuator for actuating a work attachment, a first traveling motor and a second traveling motor for actuating a traveling body. The plurality of hydraulic actuators are divided into a first group including the first traveling motor and a second group including the second traveling motor.

According to the apparatus, in a single operation state where only one of a traveling operation and a work operation is performed, the flow-path selector valve is switched to a neutral position to form a flow path allowing hydraulic fluid discharged from the first and second hydraulic pumps to be supplied to the hydraulic actuators included in the first and second groups, respectively. On the other hand, in a combined operation state where the traveling operation and the work operation are simultaneously performed, the flow-path selector valve is switched to a straight traveling position to form a flow path allowing hydraulic fluid to be supplied from the first pump to the work actuator while allowing hydraulic fluid to be supplied from the first pump to both the first and second traveling motors, thereby securing the straight traveling ability of the traveling motion caused by the first and second traveling motors.

Furthermore, in order to reduce the sudden decrease in the traveling speed at the time when the flow-path selector valve is shifted from the neutral position to the straight traveling position, the straight traveling position is provided with a communication flow path. The communication flow path provides communication between a pump line connected to the first pump and a pump line connected to the second pump, thereby preventing the flow rate of hydraulic fluid to be supplied to the first and second traveling motors from being suddenly decreased by half when the flow-path selector valve is shifted from the neutral position to the straight traveling position.

It is further described in the Patent Document 1 to open the communication flow path, when a working pressure which is the driving pressure of the work actuator in the combined operation state is higher than the traveling pressure which is the driving pressure of the first and second traveling motors, to prevent the traveling motion from being suddenly decelerated and to close the communication flow path, when the traveling pressure is higher than the working pressure, to prevent further sudden deceleration.

The communication between the pump lines when the combined operation is performed, however, involves mutual communication between the work actuator and the traveling motor, thereby allowing hydraulic fluid that should be supplied to the work actuator to flow into the traveling motor at a large flow rate through the communication flow path opened as described above, especially when the working pressure is high. This disables the working pressure of the work actuator from being secured while excessively increasing the operation speed of the traveling motor.

CITATION LIST

Patent Literature

Patent Document 1: Japanese Unexamined Patent Publication No. 2006-329341

SUMMARY OF INVENTION

It is an object of the present invention to provide a hydraulic control apparatus that includes a flow-path selector valve and is provided in a work machine, the hydraulic control apparatus being capable of reducing a sudden drop in traveling speed during the shift from a single operation state to a combined operation state while securing necessary driving pressure of a work actuator in a combined operation state and restraining the traveling speed from excessive increase.

Provided is a hydraulic control apparatus to be provided in a work machine that includes a first traveling body and a second traveling body, which are provided on the left and right and capable of performing respective traveling motions, and a work attachment capable of performing a work motion, the hydraulic control apparatus including: a first pump that discharges hydraulic fluid; a second pump that is separately provided from the first pump and discharges hydraulic fluid; a first traveling motor that is driven by supply of hydraulic fluid to make the first traveling body perform the traveling motion; a second traveling motor that is driven by supply of hydraulic fluid to make the second traveling body perform the traveling motion; a work actuator that is driven by supply of hydraulic fluid to make the work attachment perform a target work motion included in the work motion; a flow-path selector valve capable of making a flow-path switching motion for switching a flow path of hydraulic fluid discharged by the first pump and the second pump, the flow-path switching motion being a motion of being shifted between a first position for forming a flow path for allowing hydraulic fluid discharged from the first pump to be supplied to the first traveling motor and allowing hydraulic fluid discharged from the second pump to be supplied to the second traveling motor and the work actuator without being supplied to the first traveling motor and a second position for forming a first flow path for allowing hydraulic fluid discharged from the first pump to be supplied to the work actuator and a second flow path for allowing hydraulic fluid discharged from the second pump to be supplied to the first traveling motor and the second traveling motor and forming a communication flow path providing communication between the first flow path and the second flow path, the communication flow path having an opening area that is variable by the flow-path switching motion; a driving state detector that detects a physical quantity which is an index of a driving state of the work actuator and varied with a variation in the load of the work actuator; and a flow-path switching control unit that makes the flow-path selector valve perform the flow-path switching motion, the flow-path switching control unit configured to shift the flow-path selector valve to the first position in a single operation state where only one of a target work operation that is an operation for making the work attachment perform the target work motion and a traveling operation that is an operation for making the first traveling motor and the second traveling motor perform the respective traveling motions and to shift the flow-path selector valve to the second position in a combined operation state where the target work operation and the traveling operation are simultaneously performed. The flow-path switching control unit stores an allowable range of the physical quantity, the allowable range being set in correspondence with a target work operation amount which is a magnitude of the target work operation, and operates the flow-path selector valve so as to make the opening area of the communication flow path smaller in a case where the physical quantity detected by the driving state detector in the combined operation state is deviated from the allowable range corresponding to the target work operation amount than that in a case where the detected physical quantity is within the allowable range.

DESCRIPTION OF EMBODIMENTS

With reference to FIGS. 1 to 8 will be described an embodiment of the present invention.

Figure 1:
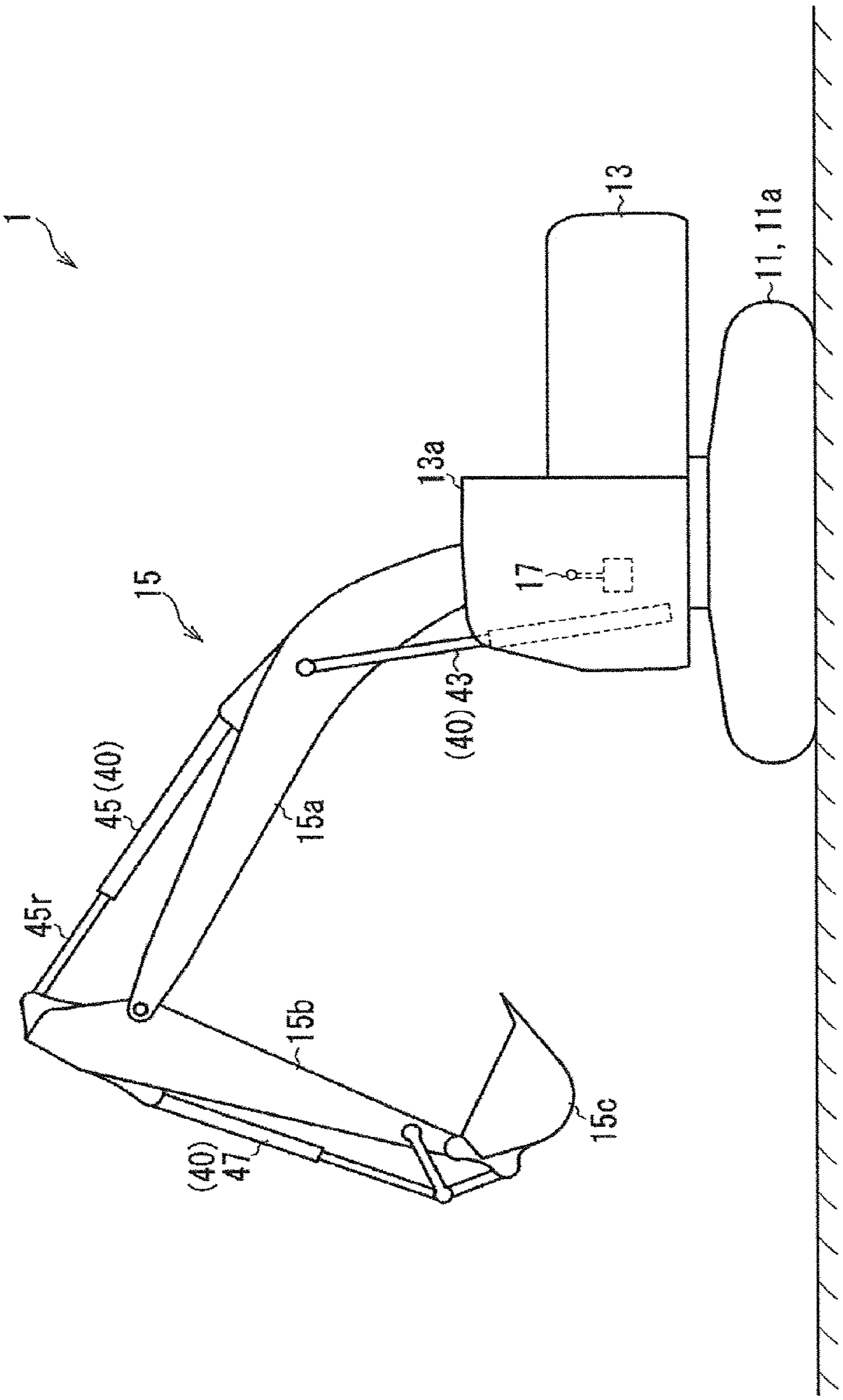
FIG. 1 is a side view of a work machine 1 according to an embodiment of the present invention.

FIG. 1 shows a work machine 1 according to the embodiment. The work machine 1 is a machine for performing work, for example, a construction machine for performing construction work, for example, an excavator. The work machine 1 includes a lower traveling body 11, an upper turning body 13, a work attachment 15, a plurality of operation units 17, and a hydraulic control apparatus 20 shown in FIG. 2.

The lower traveling body 11 includes a pair of crawlers 11*a* that is a first traveling body and a second traveling body provided on the right and left, respectively (FIG. 1 shows only a left crawler 11A). Each of the pair of crawlers 11*a* is capable of performing a traveling motion on the ground, which enables the lower traveling body 11 and further the entire work machine 1 including the same to be moved in a traveling direction corresponding to the traveling motion. The upper turning body 13 is mounted on the lower traveling body 11 capably of turning to the lower traveling body 11. The upper turning body 13 includes an operation chamber 13*a*, in which an operation for moving the work machine 1 is performed by an operator.

The work attachment 15 is attached to the upper turning body 13 and performs a work motion that is a motion for the work. The work attachment 15 includes a boom 15*a*, an arm 15*b*, and a bucket 15*c*. The boom 15*a* is attached to the upper turning body 13 capably of vertically rotational motion, namely, derrick motion, relative to the upper turning body 13. The arm 15*b* is attached to the distal end of the boom 15*a* capably of vertically rotational motion, namely, an arm pushing motion and an arm crowding motion, relative to the boom 15*a*. The bucket 15*c* is a part directly contactable with the earth and sand for work such as excavation, transportation and leveling of earth and sand. The bucket 15*c* is attached to the distal end of the arm 15*b* capably of vertically rotational motion relative to the arm 15*b*. The "work motion" performed by the work attachment 15, thus, includes the derrick motion of the boom 15*a*, the rotational motion of the arm 15*b*, and the rotational motion of the bucket 15*e*. In this embodiment, the rotational motion of the arm 15*b* corresponds to the "target work motion".

To the plurality of operation units 17, respective operations for moving the work machine 1 are applied by an operator. The plurality of operation units 17 are disposed, for example, in the operation chamber 13*a*. Each of the operation units 17 includes an operation member to which the operation is applied, for example, a lever (operation lever). The plurality of operation units 17 include a plurality of work operation units, a first traveling operation unit 171, and a second traveling operation unit 172.

To the plurality of work operation units are applied respective work operations for moving the work attachment 15. The plurality of work operation units include an arm operation unit 17*a* shown in FIG. 2, to which an arm operation is applied, the arm operation being an operation for making the arm 15*b* perform the rotational motion. In addition to the arm operation unit 17*a*, the plurality of work operation units include a boom operation unit to which a boom operation for moving the boom 15*a* is applied and a bucket operation unit to which a bucket operation for moving the bucket 15*c* is applied.

To the first traveling operation unit 171 is applied a first traveling operation that is an operation for making the crawler 11*a* corresponding to the first traveling body out of the pair of crawlers 11*a* of the lower traveling body 11 perform the traveling motion. The first traveling operation is, specifically, an operation for operating the first traveling motor 31 included in the plurality of actuators 28, as will be described later.

To the second traveling operation unit 172 is applied a second traveling operation that is an operation for making the crawler 11*a* corresponding to the second traveling body out of the pair of crawlers 11*a* perform the traveling motion. The second traveling operation is, specifically, an operation for operating the second traveling motor 32 included in the plurality of actuators 28.

There are states of applying operations to the work machine 1, namely, a single operation state where only one of the target work operation and the traveling operation (at least one of the first traveling operation and the second traveling operation) is performed and a combined operation state where the target work operation and the traveling operation are simultaneously performed. The target work operation is an operation for making the work attachment 15 perform the target work motion, which is, in this embodiment, an operation for making the arm 15*b* perform the rotational motion, namely, the arm operation.

Figure 2:
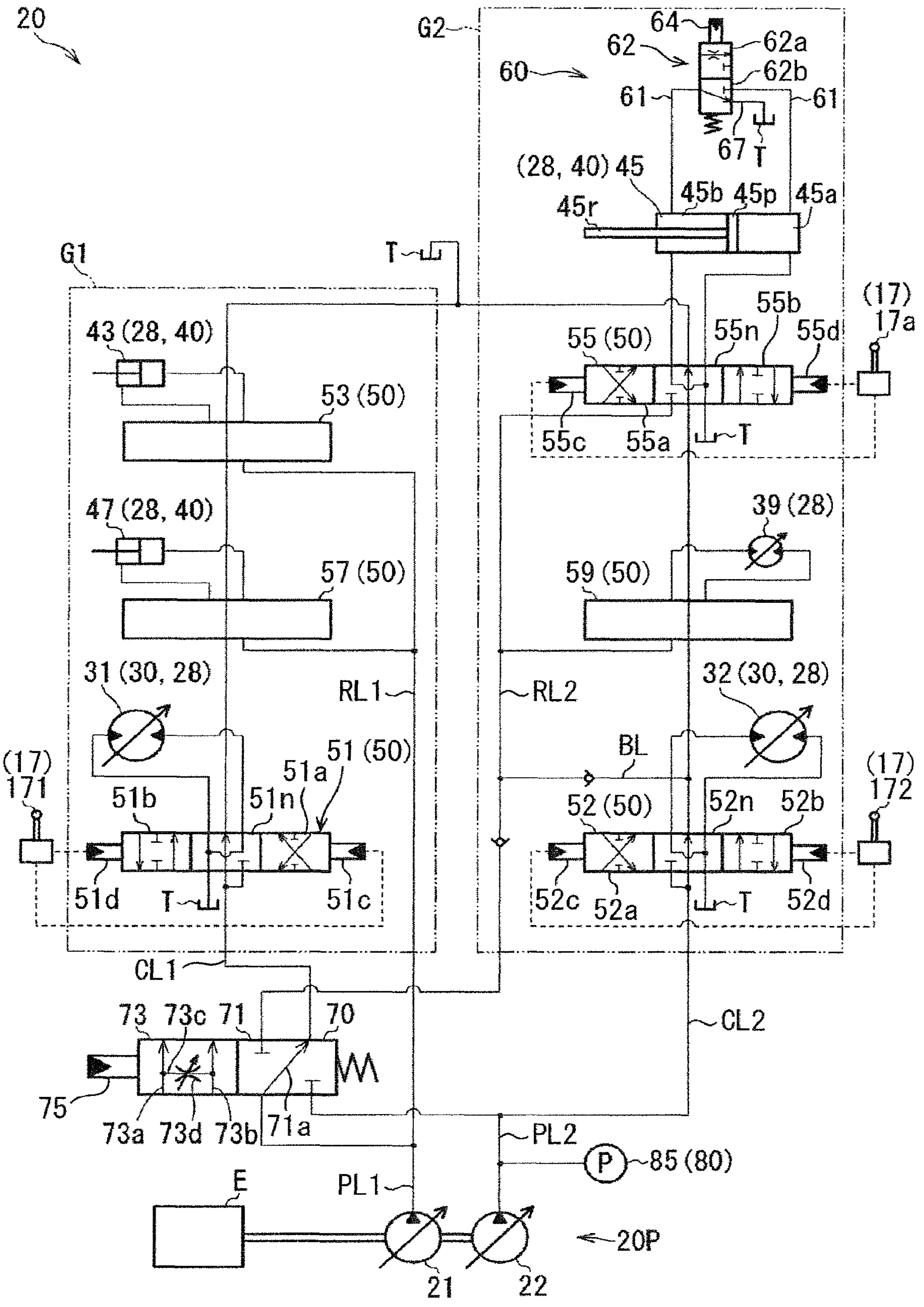
FIG. 2 is a hydraulic circuit diagram showing a hydraulic control apparatus 20 installed on the work machine 1 shown in FIG. 1.
Figure 3:
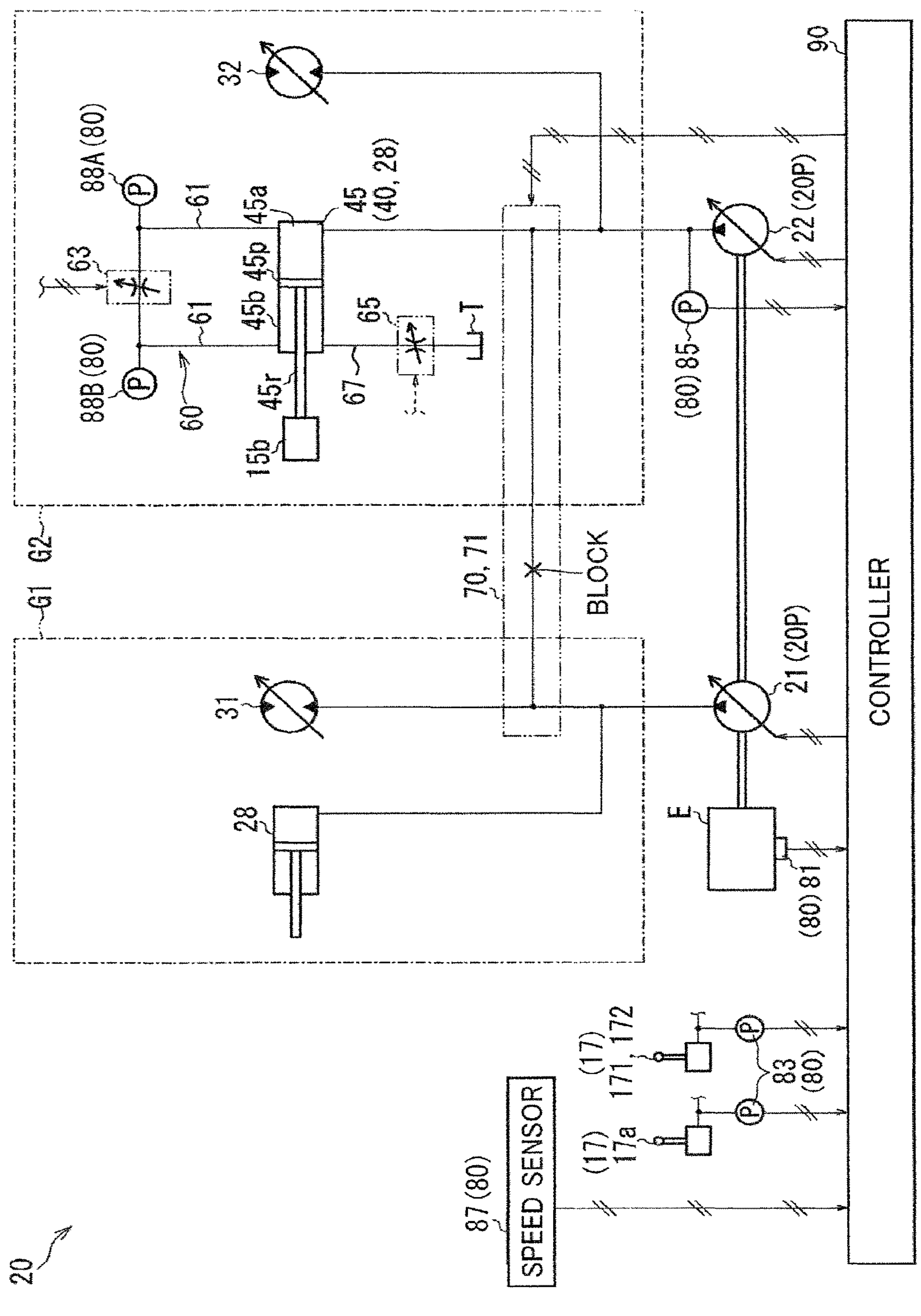
FIG. 3 is a circuit diagram showing a flow path formed by the hydraulic control apparatus 20 in a single operation state.

The hydraulic control apparatus 20 is an apparatus for hydraulically controlling the motion of the work machine 1, being composed mainly of a hydraulic circuit as shown in FIG. 2. The hydraulic control apparatus 20 includes a pump unit 20P, a plurality of actuators 28, a plurality of control valves 50, a regeneration circuit 60, a straight traveling valve 70, a plurality of sensors 80 and a controller 90, as shown in FIG. 3.

The pump unit 20P is a hydraulic source of the hydraulic circuit. The pump unit 20P includes a first pump 21 and a second pump 22, each of which is driven by an engine E to discharge hydraulic fluid and supply the hydraulic fluid to each of the plurality of actuators 28. Each of the first and second pumps 21 and 22 is a variable displacement hydraulic pump having a pump capacity variable in accordance with a pump capacity command that is input.

Each of the plurality of actuators 28 is a hydraulic actuator driven by supply of hydraulic fluid thereto. The plurality of actuators 28 include an expandable hydraulic cylinders and hydraulic motors. Specifically, the plurality of actuators 28 include a first traveling motor 31, a second traveling motor 32, a turning motor 39 and a plurality of work actuators 40.

The first and second traveling motors 31 and 32 are driven so as to make the first and second traveling bodies, namely, the pair of crawlers 11*a* and 11*b* of the lower traveling body 11, perform the traveling motions, respectively. Each of the first and second traveling motors 31 and 32 is a hydraulic motor, specifically, a variable displacement hydraulic motor having a motor capacity variable in accordance with a capacity command input thereto. The first traveling motor 31 makes the first traveling body, specifically, one of the right and left crawlers 11*a*, for example, the right crawler 11*a*, perform the traveling motion. The second traveling motor 32 makes the second traveling body, specifically, the other of the right and left crawlers 11*a*, for example, the left crawler 11*a*, perform the traveling motion.

The turning motor 39 is driven so as to turn the upper turning body 13 relatively to the lower traveling body 11. The turning motor 39 is a hydraulic motor. The turning motor turns the upper turning body 13 relatively to the lower traveling body 11, thereby turning the work attachment 15 relatively to the lower traveling body 11. The turning motor 39 is not included in the plurality of work actuators 40 in this embodiment, but may be included in the plurality of work actuators 40.

Each of the plurality of work actuators 40 is driven so as to make the work attachment 15 perform the work motion. Each of the plurality of work actuators 40 is a hydraulic cylinder. The plurality of work actuators 40 include a boom cylinder 43, an arm cylinder 45, and a bucket cylinder 47, which are shown in FIG. 1.

The boom cylinder 43 is expanded and contracted so as to vertically rotationally move the boom 15*a* relatively to the upper turning body 13, that is, so as to make the boom 15*a* perform the derricking motion. Each of the boom cylinder 43 and the bucket cylinder 47 has a rod chamber and a head chamber, and performs expansion and contraction motions similar to that of the arm cylinder 45 as described below.

The arm cylinder 45 is expanded and contracted to vertically rotationally move the arm 15*b* relatively to the boom 15*a*. As shown in FIG. 2, the arm cylinder 45 includes a cylinder body forming a head chamber 45*a* and a rod chamber 45*b*, a piston 45*p*, and a rod 45*r*. The piston 45*p* is loaded in the cylinder body to separate the head chamber 45A and the rod chamber 45B from each other. The arm cylinder 45 is expanded, while discharging of hydraulic fluid from the rod chamber 45*b*, by supply of hydraulic fluid to the head chamber 45*a*. The arm cylinder 45 is contracted, while discharging hydraulic fluid from the head chamber 45*a*, by supply of hydraulic fluid to the rod chamber 45*b*.

The bucket cylinder 47 is expanded and contracted so as to vertically rotationally move the bucket 15*c* relatively to the arm 15*b*.

The "work actuator" according to the present invention is selected from, for example, the arm cylinder 45, the boom cylinder 43, and the bucket cylinder 47. The "target work motion" according to the present invention is selected from respective rotational motions performed by a plurality of work attachment elements shown in FIG. 1, namely, the arm 15*b*, the boom 15*a*, and the bucket 15*c*. In this embodiment, the rotational motion of the arm 15*b* corresponds to the "target work motion", and the arm cylinder 45 corresponds to the "work actuator" according to the present invention.

The plurality of actuators 28 are divided into a first group G1 and a second group G2. The first group G1 includes actuators 28 to be supplied with hydraulic fluid from the first pump 21 in the single operation state, out of the plurality of actuators 28. Specifically, the first group G1 includes the first traveling motor 31 but does not include the arm cylinder 45. The second group G2 includes actuators 28 to be supplied with hydraulic fluid from the second pump 22 in the single operation state, out of the plurality of actuators 28. The second group G2 includes the second traveling motor 32 and the arm cylinder 45.

The turning motor 39, the boom cylinder 43, and the bucket cylinder 47 are included in either the first group G1 or the second group G2. The configuration of the hydraulic circuit may be appropriately modified. In the hydraulic circuit illustrated in FIG. 2, the boom cylinder 43 and the bucket cylinder 47 are included in the first group G1, and the turning motor 39 is included in the second group G2. In the first group G1, the actuators 28 other than the first traveling motor 31, specifically, the boom cylinder 43 and the bucket cylinder 47, are connected to the first pump 21 so as to be capable of being always supplied with hydraulic fluid discharged from the first pump 21. The second traveling motor 32 is connected to the second pump 22 so as to be capable of being always supplied with hydraulic fluid discharged from the second pump 22. The hydraulic fluid that fails to be supplied to the second traveling motor 32 out of hydraulic fluid discharged from the second pump 22 can be supplied to the actuators 28 other than the second traveling motor 32 in the second group G2, specifically, the turning motor 39 and the arm cylinder 45.

The plurality of control valves 50 are valves for controlling respective motions of the plurality of actuators 28, respectively. The plurality of control valves 50 are disposed between the pump unit 20P and the plurality of actuators 28, respectively. Each of the plurality of control valves 50 performs opening and closing motion so as to change the direction and the flow rate of hydraulic fluid to be supplied from the pump unit 20P to each of the plurality of actuators 28.

The plurality of control valves 50 include a first traveling control valve 51, a second traveling control valve 52, a boom control valve 53, an arm control valve 55, a bucket control valve 57 and a turning control valve 59.

The first traveling control valve 51 changes the direction and the flow rate of hydraulic fluid to be supplied to the first traveling motor 31 to thereby render the rotational motion of the first traveling motor 31 controllable. The second traveling control valve 52 changes the direction and the flow rate of hydraulic fluid to be supplied to the second traveling motor 32 to thereby render the rotational motion of the second traveling motor 32 controllable. The arm control valve 55, which corresponds to the "work control valve" according to the present invention, changes the direction and the flow rate of hydraulic fluid to be supplied to the arm cylinder 45 to thereby render the expansion and contraction motions of the arm cylinder 45 controllable. The boom control valve 53, the bucket control valve 57, and the turning control valve 59 are respective valves for controlling the rotational motion of the turning motor 39, the expansion and contraction motions of the boom cylinder 43, and the expansion and contraction motions of the bucket cylinder 47. The hydraulic circuit may include a not-graphically-shown bleed valve, which is opened to allow hydraulic fluid that is discharged from the first pump 21 and the second pump 22 but unsupplied to the plurality of actuators 28 to be returned to the tank T.

In the hydraulic circuit illustrated in FIG. 2, the first center bypass line CL1 is selectively connectable to the first pump line PL1 connected to the discharge port of the first pump 21 or the second pump line PL2 connected to the discharge port of the second pump 22, via the straight traveling valve 70. The first traveling control valve 51, the bucket control valve 57, and the boom control valve 53 are respective control valves corresponding to the actuators 28 included in the first group G1, being arranged in this order from the upstream side along the first center bypass line CL1. The first center bypass line CL1 reaches the tank T. Furthermore, a first parallel line RL1 is directly connected to the first pump line PL1 in parallel with the first center bypass line CL1, allowing hydraulic fluid to be supplied in parallel from the first pump 21 to the bucket cylinder 47 and the boom cylinder 43 through the first parallel line RL1 via the bucket control valve 57 and the boom control valve 53, respectively.

The first traveling control valve 51 is shiftable between a neutral position 51*n* for opening the first center bypass line CL1 as it is and an advance drive position 51*a* and a reverse drive position 51*b* for guiding the hydraulic fluid that flows through the first center bypass line CL1 to the advance drive port and the reverse drive port of the first traveling motor 31, respectively. The first traveling control valve 51 has a pair of advance pilot port 51*c* and a reverse pilot port 51*d* disposed at opposite positions to each other, configured to be shifted to the advance drive position 51*a* by input of a pilot pressure to the advance pilot port 51*c* to allow the first traveling motor 31 to be driven in a normal rotational direction (advance drive direction) and configured to be shifted to the reverse drive position 51*b* by input of a pilot pressure to the reverse pilot port 51*d* to allow the first traveling motor 31 to be driven in a reverse rotational direction (reverse drive direction).

To the advance and reverse pilot ports 51*c* and 51*d*, the first traveling operation unit 171 is connected. The first traveling operation unit 171 is operated to input a pilot pressure to the advance pilot port 51*c*, by application of a first traveling operation in an advance operation direction to the operation lever of the first traveling operation unit 171, and operated to input a pilot pressure to the reverse pilot port 51*d*, by application of the first traveling operation in a reverse operation direction to the operation lever.

To the second pump line PL2, a second center bypass line CL2 is directly connected. The second traveling control valve 52, the turning control valve 59, and the arm control valve 55 are control valves included in the second group G2, being arranged in this order from the upstream side along the second center bypass line CL2. The second center bypass line CL2 reaches the tank T. Furthermore, a second parallel line RL2 is disposed in parallel with the second center bypass line CL2, being connectable to the first pump line PL1 via the straight traveling valve 70 to allow hydraulic fluid to be supplied to the turning motor 39 and the arm cylinder 45 from the first pump 21 through the turning control valve 59 and the arm control valve 55, respectively, in parallel through the second parallel line RL2. Besides, a branch line BL is branched from the second center bypass line CL2 at a position downstream of the second traveling control valve 52 and connected to the second parallel line RL2.

The second traveling control valve 52 is shiftable between a neutral position 52*n* for opening the second center bypass line CL2 as it is and an advance drive position 52*a* and a reverse drive position 52*b* for guiding the hydraulic fluid that flows through the second center bypass line CL2 to the advance drive port and the reverse drive port of the second traveling motor 32, respectively. The second traveling control valve 52 has a pair of advance pilot port 52*c* and a reverse pilot port 52*d* disposed at opposite positions to each other, being configured to be shifted to the advance drive position 52*a* by input of a pilot pressure to the advance pilot port 52*c* to allow the second traveling motor 32 to be driven in a normal rotational direction (advance direction) and configured to be shifted to the reverse drive position 52*b* by input of a pilot pressure to the reverse pilot port 52*d* to allow the second traveling motor 32 to be driven in a reverse rotational direction (reverse direction).

To the advance and reverse pilot ports 52*c* and 52*d*, the second traveling operation unit 172 is connected. The second traveling operation unit 172 is operated to input a pilot pressure to the advance pilot port 52*c*, by application of a second traveling operation in the advance operation direction to the operation lever of the second traveling operation unit 172, and operated to input a pilot pressure to the reverse pilot port 52*d*, by application of the second traveling operation in the reverse operation direction to the operation lever.

The arm control valve 55 is shiftable between a neutral position 55*n* for opening the second center bypass line CL2 as it is and an arm crowding drive position 55*a* and an arm pushing drive position 55*b* for guiding the hydraulic fluid to be supplied from the first pump 21 through the second parallel line RL2 to the head chamber 45*a* and the rod chamber 45*b* of the arm cylinder 45, respectively. The arm control valve 55 has a pair of arm crowding pilot port 55*c* and arm pushing pilot port 55*d* disposed at opposite positions to each other, configured to be shifted to the arm crowding drive position 55*a* by input of a pilot pressure to the arm crowding pilot port 55*c* to allow the arm cylinder 45 to be driven in the expansion direction (an arm crowding drive direction) and configured to be shifted to the arm pushing drive position 55*b* by input of a pilot pressure to the arm pushing pilot port 55*d* to allow the arm cylinder 45 to be driven in the contraction direction (arm pushing drive direction).

To the arm crowding and arm pushing pilot ports 55*c* and 55*d*, the arm operation unit 17*a* is connected. The arm operation unit 17*a* is operated to input a pilot pressure to the arm crowding pilot port 55*c*, by application of a work operation in an arm crowding operation direction to the operation lever of the arm operation unit 17*a*, and operated to input a pilot pressure to the arm pushing pilot port 55*d*, by application of a work operation in an arm pushing operation direction to the operation lever.

The regeneration circuit 60 is a circuit for increasing the driving speed of the arm cylinder 45 (in this embodiment, the expansion speed). The regeneration circuit 60 includes a regeneration flow path 61 and a regeneration selector valve 62.

The regeneration flow path 61 is a flow path providing direct communication between the rod chamber 45*b* and the head chamber 45*a* of the arm cylinder 45, being constituted, for example, by piping.

The regeneration selector valve 62 is provided in the regeneration flow path 61, having both function as a regeneration valve provided in the regeneration flow path 61 and function as a regeneration release valve provided in a return flow path 67 providing communication between the rod chamber 45*b* and the tank T.

The function of the regeneration selector valve 62 as the regeneration valve is a function of being shifted between an opening state (merging allowing state) of opening the regeneration flow path 61 to allow discharge hydraulic fluid, which is hydraulic fluid discharged from the arm cylinder 45, to be merged into supply hydraulic fluid, which is hydraulic fluid to be supplied to the arm cylinder 45, through the regeneration flow path 61 and a closing state (merging prevention state) of blocking the regeneration flow path 61 to thereby prevent the merging. More specifically, the function is a function of being shifted between a state of allowing hydraulic fluid discharged from the rod chamber 45*b* along with the expansion of the arm cylinder 45 to be merged into hydraulic fluid to be supplied to the head chamber 45*a* and a state of preventing the merging. The change in the opening degree of the regeneration selector valve 62 as the regeneration valve, that is, the change in the opening degree of the regeneration flow path 61, may be either selective change between full open and block or continuous change from the full open to the block.

The function of the regeneration selector valve 62 as the regeneration release valve is a function of being shifted between a state of allowing hydraulic fluid discharged from the arm cylinder 45 to be returned to the tank T through the return flow path 67 and a state of preventing the return. More specifically, the function is a function of being shifted between an opening state (merging release state) of opening the return flow path 67 to thereby allow the discharge hydraulic fluid discharged from the rod chamber 45*b* along with the expansion of the arm cylinder 45 to return to the tank T and a closing state (release prevention state) of blocking the return flow path 67 to thereby prevent or restrain the discharge hydraulic fluid from being returned to the tank T. The change in the opening degree of the regeneration selector valve 62 as the regeneration release valve, that is, the change in the opening degree of the return flow path 67, may be also either selective change between full open and block or continuous change from the full open to the block.

The regeneration selector valve 62 according to this embodiment is composed of a pilot selector valve having a pilot port 64 as shown in FIG. 2, being shiftable between a regeneration allowing position 62A and a regeneration release position 62B. The regeneration selector valve 62 is kept at the regeneration release position 62*b* with input of no pilot pressure to the pilot port 64, thereby blocking the regeneration flow path 61 to prevent the discharge hydraulic fluid from being merged as described above while opening the return flow path 67 to allow the discharge hydraulic fluid to return to the tank T. In contrast, by input of the pilot pressure to the pilot port 64, the regeneration selector valve 62 is shifted from the regeneration release position 62*b* to the regeneration allowing position 62*a* by a stroke corresponding to the magnitude of the pilot pressure, thereby opening the regeneration flow path 61 at the opening degree corresponding to the stroke to allow the discharge hydraulic fluid to be merged into the supply hydraulic fluid at a flow rate (regeneration flow rate) corresponding to the stroke, while blocking or throttling the return flow path 67 to prevent or restrain the discharge hydraulic fluid from being returned to the tank T.

Figure 4:
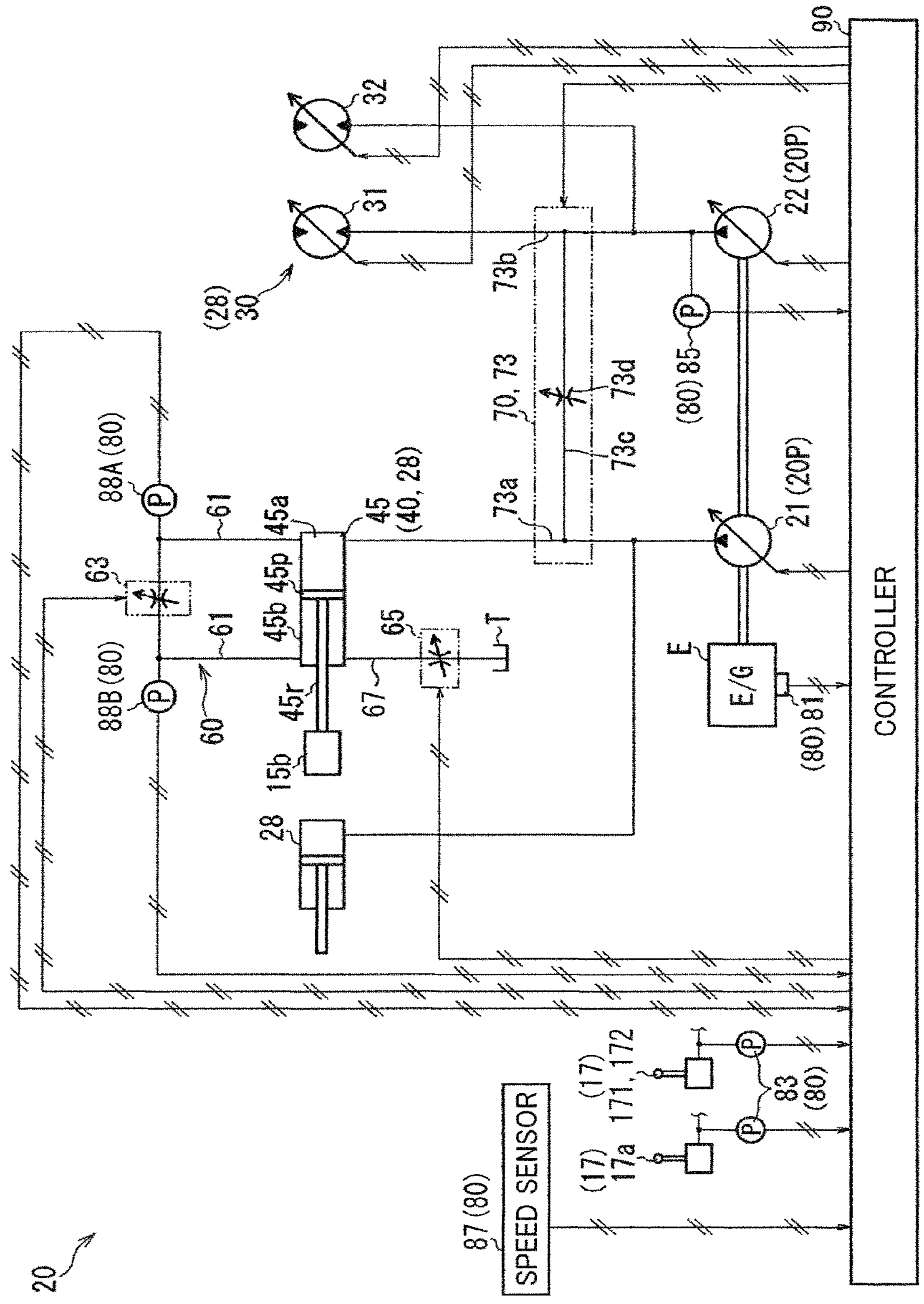
FIG. 4 is a circuit diagram showing a flow path formed by the hydraulic control apparatus 20 in a combined operation state.

The regeneration valve and the regeneration release valve may be composed of separate valves from each other. For example, as schematically shown in FIGS. 3 and 4, it is also possible to dispose a regeneration valve 63 and a regeneration release valve 65 that are separate from each other in the regeneration flow path 61 and in the return flow path 67, respectively. Each of the regeneration valve 63 and the regeneration release valve 65 may be either a variable throttle valve as shown in FIGS. 3 and 4 or a simple selector valve. In FIGS. 3 and 4, where a pilot circuit for selecting regeneration is not graphically shown, a signal that is output from the controller 90 is shown as if being directly input to the regeneration valve 63 and the regeneration release valve 65.

The straight traveling valve 70 is a flow-path selector valve that switches a flow path for supplying hydraulic fluid discharged from each of the first pump 21 and the second pump 22 to the plurality of actuators 28. The straight traveling valve 70 is capable of switching the flow path between a flow path for the single operation state and a flow path for the combined operation state.

Specifically, the straight traveling valve 70 has two switchable positions, namely, a neutral position 71 as a first position and a straight traveling position 73 as a second position. In this embodiment, the straight traveling valve 70 is a hydraulic selector valve having a pilot port 75. The straight traveling valve 70 is kept at the neutral position 71 with input of no pilot pressure to the pilot port 75, but can be shifted from the neutral position 71 to the straight traveling position 73 by input of a pilot pressure to the pilot port 75, by a stroke corresponding to the magnitude of the pilot pressure, that is, being capable of performing a flow-path switching motion. In FIG. 3 and FIG. 4, where a pilot circuit connected to the straight traveling valve 70 is also not graphically shown, a signal that is output from the controller 90 is shown as if being directly input to the straight traveling valve 70, for convenience.

The straight traveling valve 70 forms a flow path for the single operation state at the neutral position 71. The neutral position 71 is selected also when no operation is applied to any of the plurality of operation units 17. As shown in FIGS. 2 and 3, the straight traveling valve 70 blocks the communication between the first pump 21 and the second pump 22 at the neutral position 71, at which the straight traveling valve 70 allows hydraulic fluid discharged from the first pump 21 and the second pump 22 to be supplied to the actuators 28 included in the first group G1 and the actuators 28 included in the second group G2, respectively, and independently of each other. More specifically, when the neutral position 71 is selected, the straight traveling valve 70 forms a flow path 71*a* interconnecting the first pump line PL1 and the first center bypass line CL1 to allow hydraulic fluid discharged from the first pump 21 to be supplied to the actuators 28 included in the first group G1, while blocking both the first center bypass line CL1 and the second parallel line RL2 from the second pump line PL2 to thereby allow hydraulic fluid discharged from the second pump 22 to be supplied only to the actuators 28 included in the second group G2. The straight traveling valve 70, thus, prevents hydraulic fluid discharged from the first pump 21 from being supplied to the actuators 28 included in the second group G2 and prevents hydraulic fluid discharged from the second pump 22 from being supplied to the actuators 28 included in the first group G1, when the neutral position 71 is selected.

At the straight traveling position 73, the straight traveling valve 70 forms a flow path for the combined operation state. The flow path is a flow path for urging the lower traveling body 11 into straight traveling as described later. As shown in FIGS. 2 and 4, when the straight traveling position 73 is selected, the straight traveling valve 70 allows hydraulic fluid discharged from the first pump 21 and the second pump 22 to be supplied to the first and second traveling motors 31 and 32 and the arm cylinder 45 as a work actuator, respectively and independently of each other. When the straight traveling position 73 is selected, the straight traveling valve 70 according to this embodiment allows hydraulic fluid discharged from the first pump 21 to be supplied to the actuators 28 other than the first and second traveling motors 31 and 32. For example, when the straight traveling position 73 is selected, the straight traveling valve 70 allows hydraulic fluid discharged from the first pump 21 to be supplied to the arm cylinder 45. When the straight traveling position 73 is selected, the straight traveling valve 70 allows hydraulic fluid discharged from the second pump 22 to be supplied to the first traveling motor 31 and the second traveling motor 32.

At the straight traveling position 73, the straight traveling valve 70 forms a first flow path 73*a*, a second flow path 73*b*, and a communication flow path 73*c*.

The first flow path 73*a* interconnects the first pump line PL1 and the second parallel line RL2, thereby allowing hydraulic fluid discharged from the first pump 21 to be supplied to the arm cylinder 45 via the arm control valve 55. The first flow path 73*a* according to this embodiment also allows hydraulic fluid discharged from the first pump 21 to be supplied to the turning motor 39 via the turning control valve 59. The second flow path 73*b* interconnects the second pump line PL2 and the first center bypass line CL1, thereby allowing hydraulic fluid discharged from the second pump 22 to be supplied not only to the second traveling motor 32 but also to the first traveling motor 31 via the first traveling control valve 51.

The communication flow path 73*c* provides communication between the first flow path 73*a* and the second flow path 73*b*, thereby restraining the first and second traveling motors 31 and 32 from being suddenly decelerated when the operation state is shifted from the single operation state where only the traveling operation is performed to the combined operation state, that is, when the straight traveling valve 70 is shifted from the neutral position 71 to the straight traveling position 73. The communication flow path 73*c* includes a throttle 73*d* having a variable opening area, which is increased with an increase in the stroke of the flow-path switching motion from the neutral position 71 to the straight traveling position 73 (that is, the increase in the pilot pressure). When the stroke is equal to or less than a fixed stroke, the opening area is 0, so that the first flow path 73*a* and the second flow path 73*b* are blocked from each other.

When the straight traveling position 73 is selected and the opening area of the throttle 73*d* is 0 (i.e., when the communication flow path 73*c* is blocked), the straight traveling valve 70 prevents hydraulic fluid discharged from the first pump 21 from being supplied to any of the first and second traveling motors 31 and 32. The straight traveling valve 70 may be configured to prevent hydraulic fluid discharged from the second pump 22 from being supplied to the actuators 28 other than the first and second traveling motors 31 and 32 when the communication flow path 73*c* is thus blocked.

As shown in FIGS. 3 and 4, the plurality of sensors 80 include an engine speed sensor 81, a plurality of pilot pressure sensors 83, a pump pressure sensor 85, and a speed sensor 87.

The engine speed sensor 81 detects the number of revolutions of the engine E, thereby allowing the number of revolutions of each of the first pump 21 and the second pump 22 to be detected. The engine speed sensor 81, thus, can serve as a pump rotation speed detector that detecting the rotation speed of each of the first and second pumps 21 and 22. The pump rotation speed detector, alternatively, may be a sensor directly detecting the rotation speed of the first pump 21 and the second pump 22.

The plurality of pilot pressure sensors 83 detect respective pilot pressures that are output from the plurality of work operation units including the plurality of work operation units (including the arm operation unit 17*a*) and the first and second traveling operation units 171 and 172, thereby allowing respective operations (including the work operation and the first and second traveling operations) applied to the plurality of operation units 17 to be detected. The plurality of pilot pressure sensors 83, thus, constitute an operation detector that detects the presence or absence of an operation applied to each of the plurality of operation units 17 and the amount of the operation which is the magnitude of the operation. In the case where each of the plurality of operation units 17 is configured to output an electric signal corresponding to the operation applied thereto, the operation detector may be configured to detect the electric signal. The operation detector, alternatively, may be an angle sensor that detects an angle of the tilt of the operation lever, which is tilted with the application of an operation to each of the plurality of operation units 17.

As shown in FIG. 3, the pump pressure sensor 85 detects a discharge pressure which is a pressure of hydraulic fluid discharged from the second pump 22, namely, a second pump pressure which is the pump pressure of the second pump 22. The pump pressure sensor 85 can serve, in the single operation state, as a work actuator load detector that detects a load applied to the arm cylinder 45.

The speed sensor 87 is a speed detector that detects a target work motion speed which is the speed of a target work motion which is a motion generated by the work actuator, out of the work motions, specifically, an arm rotational motion speed which is the rotational motion speed of the arm 15*b* shown in FIG. 1 in this embodiment. The speed sensor 87 can serve as a driving state detector that detects a physical quantity indicating the driving state of the arm cylinder 45.

The physical quantity detected as an index of the driving state is not limited to the target work motion speed, which is the arm rotational motion speed in this embodiment. The driving state detector is, therefore, not limited to the speed sensor 87. The physical quantity may be, for example, a cylinder thrust (actuator thrust) which is a thrust of the arm cylinder 45 which is a work actuator. The driving state detector, thus, may be a thrust detector that detects the actuator thrust.

The speed detector is not limited to one that detects the speed of the rotational motion of the arm 15*b* relative to the boom 15*a*, such as the speed sensor 87. The speed detector may detect the speed of the expansion and contraction motions of the arm cylinder 45. The speed detector, alternatively, may be constituted by an angle sensor or an acceleration sensor, and an arithmetic device that calculates a velocity based on the angle or acceleration detected by the angle sensor or the acceleration sensor.

Preferably, the thrust detector includes, for example, a head pressure sensor 88A and a rod pressure sensor 88B shown in FIGS. 3 and 4. The head pressure sensor 88A detects the pressure of hydraulic fluid in the head chamber 45*a* of the arm cylinder 45, namely, a head pressure. The rod pressure sensor 88B detects the pressure of hydraulic fluid in the rod chamber 45*b*, namely, a rod pressure. The pressure sensor is, typically, less expensive than the speed sensor. The thrust detector, therefore, can serve as the driving state detector with less expensive configuration than that of the speed detector.

The thrust of the arm cylinder 45 is the difference between a head-side force Fa and a rod-side force Fb. The head-side force Fa is the product of the pressure of hydraulic fluid in the head chamber 45*a*, namely, the head pressure, and the pressure-receiving area of the piston 45*p* to the head chamber 45*a*. The rod-side force Fb is the product of the pressure of hydraulic fluid in the rod chamber 45*b*, namely, the rod pressure, and the pressure receiving area of the piston 45*p* to the rod chamber 45*b*. Hence, the thrust detector can be constituted by the head pressure sensor 88A, the rod pressure sensor 88B, and an arithmetic device for calculating the difference between the head pressure and the rod pressure detected by the head pressure sensor 88A and the rod pressure sensor 88B, respectively. The arithmetic device may be a portion having a function of performing the operation in the controller 90. In other words, the thrust detector may include a portion of the controller 90.

The controller 90 performs taking in signals input thereto, output of command signals, arithmetic operations (judgment, calculation), storage of information and the like. The controller 90 has necessary functions in this embodiment: a flow-path switching command section, a regeneration command section, a pump capacity command section, and a motor capacity command section.

The controller 90 including the flow-path switching command section constitutes a flow-path switching control unit, which makes the straight traveling valve 70 perform the flow-path switching motion, in cooperation with a pilot hydraulic source and a flow-path switching operation valve which are not graphically shown. The pilot hydraulic source generates a pilot pressure to be input to the pilot port 75 of the straight traveling valve 70, for example, a pilot pump that is driven by the engine E. The flow-path switching operation valve is interposed between the pilot hydraulic source and the pilot port 75 to adjust the pilot pressure to be finally input to the pilot port 75. Specifically, the flow-path switching operation valve can be composed of a solenoid valve configured to be opened at an opening degree corresponding to the magnitude of the switching command signal by input of the switching command signal to the flow-path switching operation valve, reducing the pilot pressure output from the pilot hydraulic pressure source to the pilot pressure corresponding to the switching command signal and inputting the reduced pilot pressure to the pilot port 75. The flow-path switching command section of the controller 90 generates a switching command signal corresponding to the state of the work machine 1, and inputs it to the flow-path switching operation valve, thereby operating the straight traveling valve 70. Specifically, performed are the control of the stroke from the neutral position 71*n*, that is, the shift of the position of the straight traveling valve 70, and the control of the opening area (opening degree) of the throttle 73*d*.

The controller 90 including the regeneration command section constitutes a regeneration control unit, which makes the regeneration selector valve 62 perform the flow-path switching motion, in cooperation with the pilot hydraulic source and the regeneration operation valve. The regeneration control valve is interposed between the pilot hydraulic source and the pilot port 64 of the regeneration selector valve 62 to adjust the pilot pressure to be input to the pilot port 64. Specifically, the regeneration operation valve is composed of a solenoid valve configured to be opened at an opening degree corresponding to the magnitude of the regeneration command signal by input of the regeneration command signal to the regeneration operation valve, reducing the pilot pressure output from the pilot hydraulic source to the pilot pressure corresponding to the regeneration command signal and inputting the reduced pilot pressure to the pilot port 64. The regeneration command section of the controller 90 generates a regeneration command signal corresponding to the state of the work machine 1, and inputs the regeneration command signal to the regeneration operation valve, thereby conducting the control of the stroke of the regeneration selector valve 62 from the regeneration release position 62*b* to the regeneration allowing position 62*a*, that is, switching between the regeneration and the release of the regeneration, and the control of the regeneration flow rate.

The pump capacity command section calculates the flow rate of hydraulic fluid to be discharged from each of the first pump 21 and the second pump 22 in accordance with the operation amount of each of the work operation and the traveling operation, generating a pump capacity command for providing the flow rate and inputting the pump capacity command to each of the first and second pumps 21 and 22. Besides, the motor capacity command section generates the motor capacity command according to the operating state of the work machine 1 and inputs the command to each of the first and second traveling motors 31 and 32.

Below will be described the actions of the hydraulic control apparatus 20 described above. The hydraulic control apparatus 20 makes the following actions in each of the single operation state and the combined operation state.

In the single operation state, the flow-path switching command section of the controller 90 stops the input of the switching command signal to the not-graphically-shown flow-path switching operation valve so as to keep the straight traveling valve 70 at the neutral position 71 shown in FIG. 2, that is, so as to prevent any pilot pressure from being input to the pilot port 75 of the straight traveling valve 70. The straight traveling valve 70 thus kept at the neutral position 71 allows hydraulic fluid discharged from the first pump 21 to be supplied to the actuators 28 included in the first group G1, while preventing hydraulic fluid discharged from the first pump 21 from being supplied to the actuators 28 included in the second group G2. Specifically, the hydraulic fluid discharged from the first pump 21 can be directly supplied to the bucket control valve 57 and the boom control valve 53 through the first parallel line RL1, and can be supplied to the first traveling control valve Si through the flow path 71*a* of the straight traveling valve 70 at the neutral position 71 and the first center bypass line CL1. When an operation is applied to any of the operation units 17 corresponding to the actuators 28 included in the first group G1 in this single operation state, the control valve 50 connected to the operation unit 17 to which the operation is applied is opened to allow hydraulic fluid discharged from the first pump 21 to be supplied to the actuator 28 of the first group G1 corresponding to the opened control valve 50 through the control valve 50.

On the other hand, the hydraulic fluid discharged from the second pump 22 is prevented from being supplied to the actuators 28 included in the first group G1 by the straight traveling valve 70 kept at the neutral position 71, while allowed to be supplied to the actuators 28 included in the second group G2 through the second center bypass line CL2, the branch line BL, and the second parallel line RL2. In this state, when an operation is applied to any of the operation units 17 corresponding to the actuators 28 included in the second group G2, the control valve 50 connected to the operation unit 17 to which the operation is applied is opened to allow hydraulic fluid discharged from the second pump 22 to be supplied to the actuators 28 of the second group G2 corresponding to the opened control valve 50 through the control valve 50. For example, when an operation for expanding the arm cylinder 45 to make the arm 15*b* perform the arm crowding motion which is the rotational motion in a direction to approach the boom 15*a*, namely, the arm crowding operation, is applied to the arm operation unit 17*a*, the arm operation unit 17*a* inputs a pilot pressure to the arm crowding pilot port 55*c* of the arm control valve 55 connected to the arm cylinder 45 to shift the arm control valve 55 to the arm crowding drive position 55*a*. The arm control valve 55 thereby forms a flow path allowing hydraulic fluid discharged from the second pump 22 to be supplied to the head chamber 45*a* of the arm cylinder 45 through the second parallel line RL2, and forms a flow path allowing hydraulic fluid discharged from the rod chamber 45*b* of the arm cylinder 45 to be returned to the tank T. This enables the arm cylinder 45 to expand to make the arm 15*b* shown in FIG. 1 perform the rotational motion in the arm crowding direction.

When the arm cylinder 45 is driven, there can be both a case where the regeneration control unit makes the regeneration circuit 60 perform the regeneration operation (arm regeneration operation) and a case where the regeneration control unit prevents the regeneration circuit 60 from performing the regeneration operation, that is, makes the regeneration circuit 60 perform the regeneration release operation.

The regeneration release operation is an operation in which the regeneration valve blocks the regeneration flow path 61 while the regeneration release valve opens the return flow path 67 (for example, fully opens), that is, in the circuit shown in FIG. 2, an operation in which the regeneration selector valve 62 is kept at the regeneration release position 62*b*. This regeneration release operation is an operation of preventing the discharge hydraulic fluid discharged from the rod chamber 45*b* from being supplied to the head chamber 45*a* of the arm cylinder 45 and allowing the discharge hydraulic fluid to be returned to the tank T.

The regeneration operation is an operation in which the regeneration valve opens the regeneration flow path 61 (fully opens or opens at a predetermined opening degree) while the regeneration release valve 65 fully closes or throttles the return flow path 67, that is, in the circuit shown in FIG. 2, an operation in which the regeneration selector valve 62 is shifted to the regeneration allowing position 62*a*. The regeneration operation allows hydraulic fluid discharged from the rod chamber 45*b* to flow through the regeneration flow path 61 to be supplied to the head chamber 45*a* (that is, merged into hydraulic fluid to be supplied to the head chamber 45*a*), thereby increasing the rotational motion speed of the arm 15*b* as compared with the case of no performance of the regeneration operation. As will be described in more detail below, the regeneration operation involves a reduction in the pressure of the rod chamber 45*b*, that is, the drop in the rod pressure, and further the thrust (driving force) of the arm cylinder 45, as compared with the case of no performance of the regeneration operation.

The regeneration command section of the controller 90 judges whether the regeneration circuit 60 should be made perform the regeneration operation or the regeneration release operation, in the single operation state where only the arm crowding operation which is the target work operation in this embodiment is performed out of the arm crowding operation and the traveling operation, on the basis of the load of the arm cylinder 45. For example, the regeneration command section of the controller 90 determines the performance or non-performance of regeneration on the basis of the pump pressure detected by the pump pressure sensor 85, namely, the discharge pressure of the second pump 22, in the single operation state. Specifically, when the pump pressure of the second pump 22 detected by the pump pressure sensor 85 is equal to or less than the pump pressure allowable value stored in the controller 90, that is, when the load of the arm cylinder 45 is small, the generation command section inputs the regeneration command signal to the regeneration operation valve so as to make the regeneration operation valve input the pilot pressure to the pilot port 64 of the regeneration selector valve 62 to allow the regenerative operation. In contrast, when the pump pressure of the second pump 22 is larger than the pump pressure allowable value, that is, when the load of the arm cylinder 45 is large, the generation command section stops the input of the regeneration command signal to the regeneration operation valve so as to make the regeneration operation valve stop the input of the pilot pressure to the pilot port 64 to prevent the regeneration operation.

In the combined operation state, the flow-path switching command section of the controller 90 inputs a switching command signal to the flow-path switching operation valve to allow a pilot pressure to be input to the pilot port 75 of the straight traveling valve 70, thereby shifting the straight traveling valve 70 to the straight traveling position 73. The straight traveling valve 70 forms the first flow path 73*a* allowing hydraulic fluid discharged from the first pump 21 to be supplied to the arm cylinder 45 through the second parallel line RL2 and the arm control valve 55. This allows hydraulic fluid discharged from the first pump 21 to be supplied to the arm cylinder 45 through the arm control valve 55 at a flow rate corresponding to the arm operation amount which is the magnitude of the arm operation applied to the arm operation unit 17*a*.

The straight traveling valve 70 thus shifted to the straight traveling position 73 forms the second flow path 73*b*, thereby allowing hydraulic fluid discharged from the second pump 22 to be supplied not only to the second traveling motor 32 but also to the first traveling motor 31 through the first center bypass line CL1 and the first traveling control valve 51. In this condition, when a traveling operation is applied to at least one of the first and second traveling operation units 171 and 172, the traveling control valve corresponding to the traveling operation unit to which the traveling operation is applied, out of the first and second traveling control valves 51 and 52, is opened to allow hydraulic fluid discharged from the second pump 22 to be supplied to the traveling motor corresponding to the thus opened traveling control valve out of the first and second traveling motors 31 and 32 at a flow rate corresponding to the traveling operation amount which is the magnitude of the traveling operation. The first and second traveling motors 31 and 32 are thus allowed to be driven by hydraulic fluid discharged from the common first pump 21. This enables the first and second traveling motors 31 and 32 to be supplied with hydraulic fluid at respective flow rates equal to each other when respective operation amounts of the first and second traveling operations applied to the first and second traveling operation units 171 and 172 are equal to each other, thereby enabling the first and second traveling motors 31 and 32 to be rotated at respective speeds equal to each other to cause the lower traveling body 11 to travel with high straight traveling ability.

The function of the communication flow path 73*c* formed in the straight traveling valve 70 at the straight traveling position 73 is as follows. When the target work operation (the arm operation in this embodiment) is additionally performed in a single operation state including only the traveling operation, that is, in a single traveling operation state, to thereby shift the operation state to the combined operation state, the flow-path switching control unit including the flow-path switching command section of the controller 90 shifts the straight traveling valve 70 from the neutral position 71 to the straight traveling position 73. At this time, without the communication flow path 73*c*, the state would be suddenly shifted from a state where hydraulic fluid discharged from the first pump 21 and the second pump 22 is supplied to the first and second traveling motors 31 and 32 to a state where only hydraulic fluid discharged from the second pump 22 is supplied to the first and second traveling motors 31 and 32. This rapidly reduces the flow rate of hydraulic fluid supplied to the first and second traveling motors 31 and 32 and the rotation speed of each of the first and second traveling motors 31 and 32 to thereby cause a shock such as shaking of the work machine 1. The communication flow path 73*c* reduces such sudden deceleration in the first and second traveling motors 31 and 32. Specifically, the communication flow path 73*c* allows a part of hydraulic fluid discharged from the first pump 21 to be supplied to the second traveling motor 32 at a degree corresponding to the opening area of the communication flow path 73*c*, thereby enabling the first and second traveling motors 31 and 32 to be restrained from sudden deceleration.

As a mode of the combined operation state, there is a state where the work attachment 15 performs a work motion, for example, leveling the ground with the bucket 15*c*, while the pair of crawlers 11*a* of the lower traveling body 11 perform respective traveling motions (namely, a state where leveling with traveling is performed).

As another mode of the combined operation state, there is a state of making the work attachment 15 preform a pulling-up motion for assisting the movement of the lower traveling body 11 in the traveling direction. For example, in the case where the crawler 11*a* is idly running relatively to the ground to make the traveling of the lower traveling body 11 impossible or difficult, such as the case of a largely inclined upward slope or an upward slope with a slippery surface, pulling up the work machine 1 by the motion of the work attachment 15 (the above-described pulling-up motion) can assist the lower traveling body 11 to move the work machine 1. Specifically, making the arm 15*b* perform the arm crowding motion with the tip of the bucket 15*c* stuck into the ground can assist the first and second traveling motors 31 and 32 to advance the lower traveling body 11. Such a pulling-up motion may further involve a boom rising motion of the boom 15*a*. On the other hand, there can be also a case where it is impossible or difficult to move the work machine 1 even with the pulling-up motion.

The above pulling-up motion causes a larger load to be applied to the arm cylinder 45 than the load applied to the first and second traveling motors 31 and 32. In such situation where the load of the arm cylinder 45 as a work actuator is larger than the load of the first and second traveling motors 31 and 32, opening the communication flow path 73*c* with a large opening area would cause the communication flow path 73*c* to permit hydraulic fluid that should be supplied to the arm cylinder 45 to flow to the first and second traveling motors 31 and 32 through the communication flow path 73*c*. This disables the driving pressure of the arm cylinder 45 (the hydraulic pressure required to drive the arm cylinder 45) from being secured, thereby making it impossible or difficult to drive the arm cylinder 45. On the other hand, the flow of hydraulic fluid into the first and second traveling motors 31 and 32 increases the rotation speed of each of the first and second traveling motors 31 and 32 beyond necessity, thereby increasing the possibility of idly running of the pair of crawlers 11*a* which are the first and second traveling bodies and making it difficult to escape from the idly running state. These matters may hinder the work machine 1 to move, rendering the work machine 1 stuck.

To solve the above problem, the flow-path switching control unit of the hydraulic control apparatus 20 conducts the following controls of the opening area of the communication flow path 73*c*. It should be noted that the above problem is just an example. The control is effective to solve the problem caused by the larger load of the work actuator than the load of the first and second traveling motors in a combined operation state.

The flow-path switching control unit controls the opening area of the communication flow path 73*c* on the basis of the driving state of the arm cylinder 45. Specifically, the flow-path switching command section of the controller 90 constituting the flow-path switching control unit stores a predetermined allowable range for a physical quantity to be the index of the driving state. When the physical quantity is deviated from the allowable range (for example, in a driving state where the load of the arm cylinder 45 is so large that the arm crowding motion of the arm 15*b* is hard to perform), the flow-path switching command section generates a switching command signal to make the opening area of the communication flow path 73*c* smaller than that in the case where the physical quantity is within the allowable range. The opening area may be 0. In other words, the communication flow path 73*c* may be fully blocked. Besides, when the physical quantity to be the index of the driving state is deviated from the allowable range, the regeneration control unit releases the regeneration operation of the regeneration circuit 60.

Below will be described the details of the control of the opening area of the communication flow path 73*c* and the like in the order of a plurality of steps (processing) shown in FIG. 5. The order of the plurality of steps is appropriately modifiable. The plurality of steps are roughly classified into a judgment sequence S10 and a control sequence S20 shown in FIG. 5.

In the judgment sequence S10, judged are the operation state and the propriety of the driving state of the arm cylinder 45 as a work actuator.

First, the flow-path switching command section of the controller 90 judges whether the operation state of the work machine 1 is the combined operation state or not based on the detection signal input from the pilot pressure sensor 83 as an operation detector (step S11). Specifically, the flow-path switching command section of the controller 90 judges whether or not the operation state is a state where a traveling operation is applied to at least one of the traveling operation units 171 and 172 and a target work operation for making the target work motion be performed (an arm operation for making the arm 15*b* perform a rotational motion in this embodiment) is applied to the arm operation unit 17*a*. If it is not the combined operation state (NO in step S11), the flow-path switching control unit including the flow-path switching command section of the controller 90 stops the input of any pilot pressure to the pilot port 75 of the straight traveling valve 70 to keep the straight traveling valve 70 at the neutral position 71, although not shown in FIG. 5. This causes the straight traveling valve 70 to allow hydraulic fluid discharged from the first pump 21 to be supplied to the actuators 28 (including the first traveling motor 31) included in the first group G1 and to allow hydraulic fluid discharged from the second pump 22 to be supplied to the actuators 28 (including the second traveling motor 32 and the arm cylinder 45) included in the second group G2.

When judging that it is the combined operation state (YES in step 11), the flow-path switching command section of the controller 90 judges whether or not the driving state of the arm cylinder 45 is within an allowable range, specifically, whether or not the physical quantity detected by the driving state detector, that is, the physical quantity to be the index of the driving state of the arm cylinder 45, is within a predetermined allowable range (step S13). The physical quantity to be the index of the driving state is, for example, the arm rotational motion speed (that may be the expansion/contraction speed of the arm cylinder 45) or the cylinder thrust of the arm cylinder 45, and the driving state detector includes, for example, the speed sensor 87 or the head pressure and the rod pressure sensors 88A and 88B shown in FIGS. 3 and 4.

The judgment of the propriety of the driving state and the setting of the allowable range of the physical quantity for the judgment are made based on the following concept. The driving state of the arm cylinder 45 is within the allowable range when the arm cylinder 45 is driven by a speed or thrust substantially corresponding to an arm operation (a target work operation) applied to the arm operation unit 17*a*. The allowable range is set, therefore, such that the arm rotational motion speed (expansion/contraction speed of the arm cylinder 45) or cylinder thrust as the index of the driving state at this time is within the allowable range. In contrast, the driving state of the arm cylinder 45 is deviated from the allowable range when the arm rotational motion speed (expansion/contraction speed) or thrust does not correspond to the arm operation applied to the arm operation unit 17*a*. For example, the driving state of the arm cylinder 45 is deviated from the allowable range when the arm cylinder 45 is stopped (i.e., the expansion/contraction speed is 0) in spite that an arm operation having a predetermined magnitude or more is applied to the arm operation unit 17*a*. Alternatively, the driving state of the arm cylinder 45 is deviated from the allowable range also when a large thrust is generated in the arm cylinder 45 in spite of a small arm operation.

The allowable range stored in the controller 90 is changed in accordance with the arm operation amount (target work operation amount) which is the magnitude of the arm operation. In summary, the controller 90 stores the allowable range corresponding to the arm operation amount (work operation amount).

Figure 6:
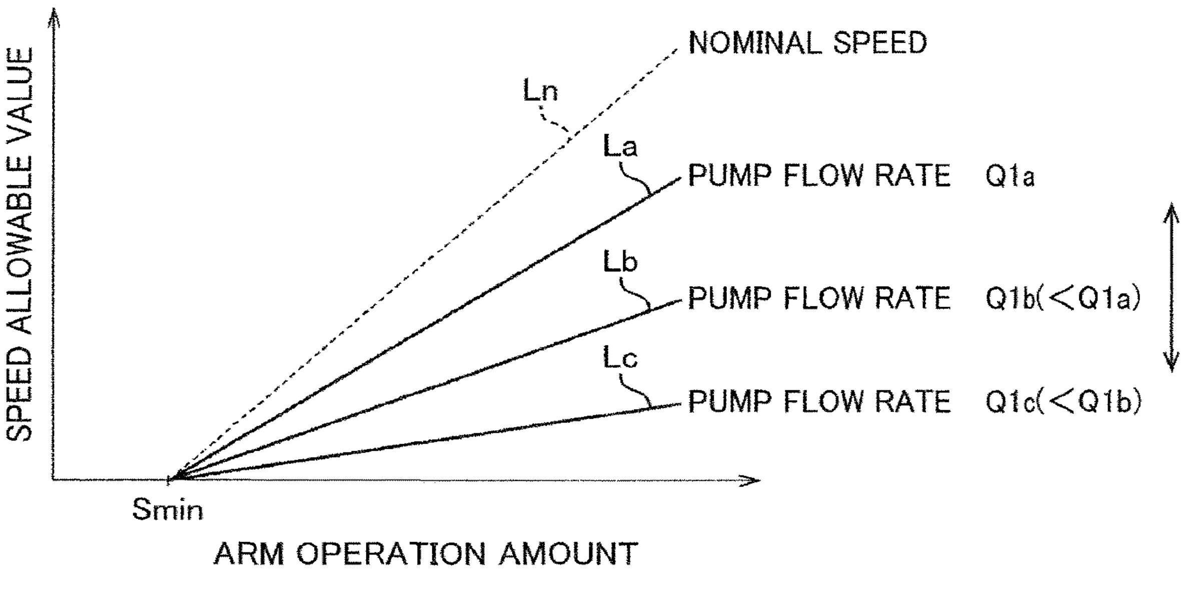
FIG. 6 is a view showing a speed allowable value that is set for the arm rotational motion speed of the work machine 1.

The detail of the case where the physical quantity as the index of the driving state of the arm cylinder 45 is the arm rotational motion speed (or the expansion/contraction speed of the arm cylinder 45), that is, the case where the driving state detector is a speed detector, is as follows. The controller 90 judges whether the speed detected by the speed detector (e.g., the rotational motion speed of the arm 15*b* detected by the speed sensor 87) is equal to or greater than a speed allowable value set for the speed. The range equal to or more than the speed allowable value is the allowable range of the arm rotational motion speed. The controller 90 stores a map that relates the speed allowable value to the target work operation amount (the arm operation amount in this embodiment) as shown in FIG. 6. According to the map, in the range of the minimum operation amount Smin or more, the smaller the arm operation amount (the target work operation amount) the smaller speed allowable value is set; in the range where the arm operation amount is less than the minimum operation amount Smin (in the range where substantially no arm operation is performed), the speed allowable value is set to 0.

Even for the same arm operation amount (target work operation amount), the expansion speed of the arm cylinder 45 and the rotational motion speed of the arm 15*b* become smaller as the first pump flow rate, which is the flow rate of hydraulic fluid discharged from the first pump 21, is smaller. For this reason, in the map stored in the controller 90, the speed allowable value is set so that the speed allowable value is changed in accordance with the discharge flow rate of the first pump 21, namely, a first pump flow rate (see FIG. 6). Specifically, according to the map, the smaller the first pump flow rate, the lower value is set as the speed allowable value corresponding to the arm operation amount. The first pump flow rate (the volume of hydraulic fluid discharged from the first pump 21 per unit time) is calculated based on the product of the number of revolutions of the engine E (the number of revolutions per unit time) and the capacity of the first pump 21, which allows the flow-path switching command section of the controller 90 to be either configured to set a lower speed allowable value as the number of revolutions of the engine E detected by the engine speed sensor 81 is lower or configured to set a lower speed allowable value as the capacity of the first pump 21 is smaller. FIG. 6 shows a broken line Ln that indicates a nominal speed, which is the rotational motion speed of the arm 15*b* corresponding to the arm operation amount when no load is applied to the arm 15*b*. FIG. 6 shows also solid lines La, Lb and Lc that indicate the speed allowable values corresponding to respective arm operation amounts when the first pump flow rate is Q1a, Q1b and Q1c (Q1a>Q1b>G1c), respectively.

The detail of the case where the detection target physical quantity that indicates the driving state of the arm cylinder 45 is the cylinder thrust of the arm cylinder 45 (actuator thrust), that is, the case where the driving state detector is a thrust detector, is as follows. The controller 90 judges whether the thrust of the arm cylinder 45 detected by the thrust detector (for example, the thrust calculated from the head pressure and the rod pressure detected by the head pressure sensor 88A and the rod pressure sensor 88B, respectively) is equal to or less than a thrust allowable value preset for the thrust. The controller 90 stores a map that relates the thrust allowable value to the target work operation amount (the arm operation amount in this embodiment). The range equal or below the thrust allowable value is the allowable range of the thrust of the arm cylinder 45. The map is, for example, provided by modifying the map shown in FIG. 6 with replacement of the "speed allowable value" with a "thrust allowable value" and replacement of the "nominal speed" with "nominal thrust".

The reason why the propriety of the driving state of the arm cylinder 45 can be judged based on the thrust of the arm cylinder 45 is as follows. When the driving state of the arm cylinder 45 is deviated from the allowable range, for example, when the load applied to the arm 15*b* is so excessive that the movement of the arm 15*b* and the arm cylinder 45 for driving the arm 15*b* is restrained or hindered, the movement of the piston 45*p* in the expansion direction by the supply of hydraulic fluid to the head chamber 45*a* is prevented or remarkably restrained because the reaction force transmitted to the piston 45*p* through the rod 45*r* of the arm cylinder 45 is large. This increases the pressure in the head chamber 45*a* as compared with the case where the load is enough small to allow the arm 15*b* to perform a rotational motion corresponding to the arm operation, that is, the case where the driving state of the arm cylinder 45 is within the allowable range. On the other hand, the pressure in the rod chamber 45*b* is, for example, substantially equal to the pressure in the tank T. Hence, the differential pressure between the head pressure and the rod pressure and the thrust of the arm cylinder 45 corresponding thereto when the driving state of the arm cylinder 45 is deviated from the allowable range is larger than that when the driving state is within the allowable range. This is the reason why the propriety of the driving state can be judged on the basis of the thrust of the arm cylinder 45. Accordingly, the flow-path switching command section of the controller 90 may judge the propriety of the driving state directly on the basis of the difference between the head pressure and the rod pressure.

Even when the hydraulic fluid that should be supplied to the arm cylinder 45 is supplied to the first traveling motor 31 through the communication flow path 73*c* as described above, the thrust of the arm cylinder 45 becomes higher when the arm 15*b* is not allowed to perform the rotational motion corresponding to the arm operation (that is, when the driving state of the arm cylinder 45 is deviated from the allowable range) than that in the case where the load is enough low to allow the arm 15*b* to perform the rotational motion corresponding to the arm operation (that is, when the driving state of the arm cylinder 45 is within the allowable range). This is the reason why the propriety of the driving state of the arm cylinder 45 can be judged based on the thrust of the arm cylinder 45.

Figure 5:
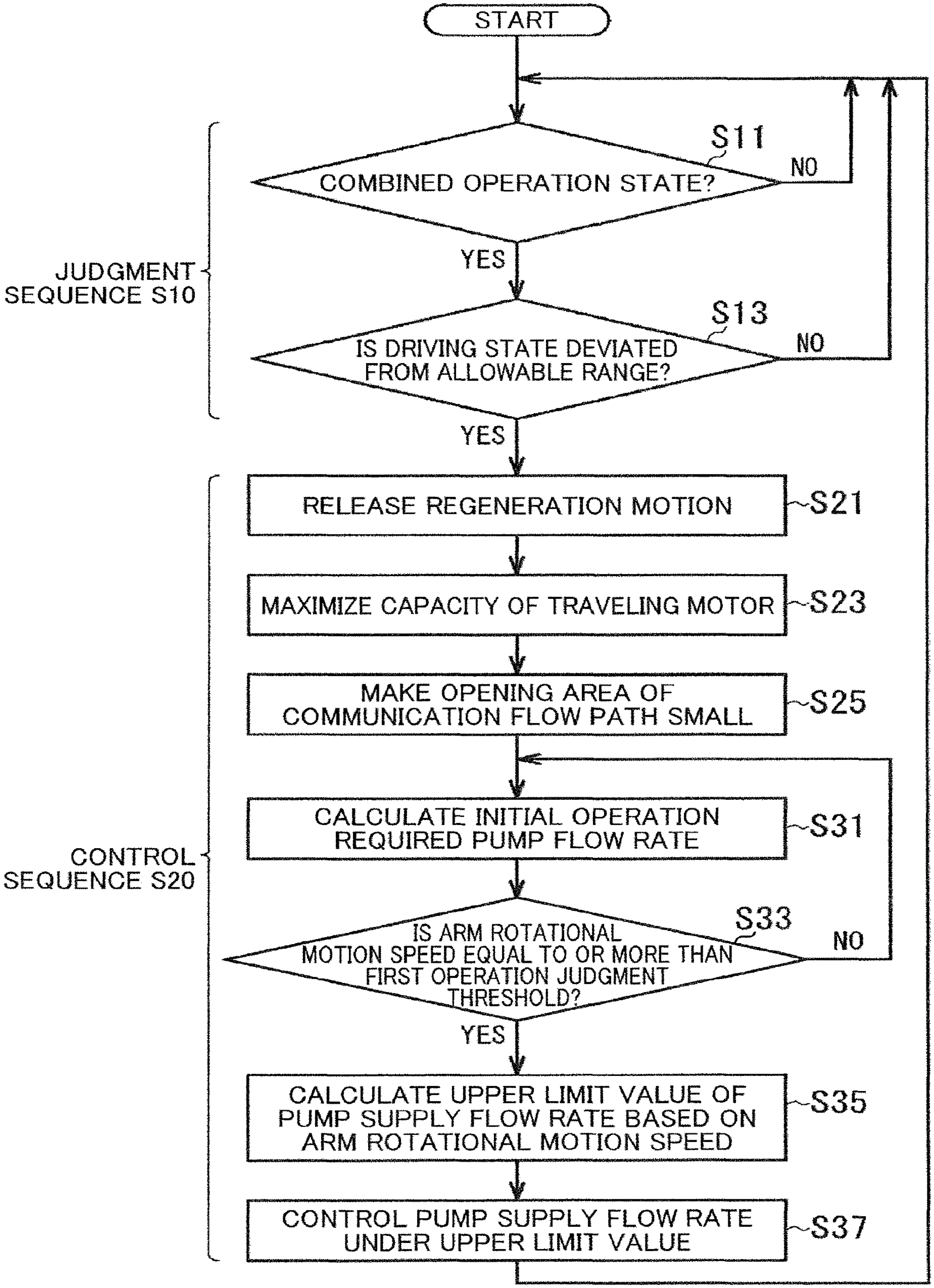
FIG. 5 is a flowchart showing a control operation performed by a controller in the hydraulic control apparatus.

When judging that the driving state of the arm cylinder 45 is within the allowable range (NO in step S13), the flow-path switching control unit, although not shown in FIG. 5, makes the straight traveling valve 70 perform a normal flow-path switching motion accompanying the shift to the combined operation state. Specifically, the flow-path switching control unit makes a large pilot pressure input to the straight traveling valve 70 to thereby make the straight traveling valve 70 stroke largely from the neutral position 71 to the straight traveling position 73 to open the communication flow path 73*c* with a large opening area. This enables the straight traveling valve 70 to be shifted to a state of allowing hydraulic fluid discharged from the first pump 21 to be supplied to the arm cylinder 45 and allowing hydraulic fluid discharged from the second pump 22 to be supplied to the first and second traveling motors 31 and 32 without causing significantly sudden deceleration in the first and second traveling motors 31 and 32.

On the other hand, when judging that the driving state of the arm cylinder 45 is deviated from the allowable range (YES in each of step S11 and step S13), the controller 90 executes the following steps included in the control sequence S20.

First, the regeneration control unit including the controller 90 makes the regeneration circuit 60 perform a regeneration release operation (step S21). The reasons therefor is as follows.

Reason 1: the regeneration release operation enables the thrust of the arm cylinder 45 to be secured. If the regeneration circuit 60 performed the regeneration operation to provide communication between the rod chamber 45*h* and the head chamber 45*a* in spite that the driving state of the arm cylinder 45 is deviated from the allowable range, the rod pressure would be raised to increase the force by which the piston 45*p* is pushed from the rod chamber 45*b* toward the head chamber 45*a*. This reduces the thrust of the arm cylinder 45 as compared with the case where the regeneration circuit 60 performs no regeneration operation, rendering the rotational motion of the arm 15*b* more difficult. In contrast, the regeneration release operation of the regeneration circuit 60 allows the rod pressure to be approximately equal to the pressure of the tank T, thereby enabling the thrust of the arm cylinder 45 to be increased to make the arm 15*b* perform a normal rotational motion.

Reason 2: the regeneration release operation restrains the first pump flow rate from being reduced by PQ control. The PQ control is a pump flow control in consideration with the horsepower of the engine E, and the pump capacity command section of the controller 90 performs, for example, the following control. When the first pump pressure, which is the discharge pressure of the first pump 21, is equal to or less than a preset first pump pressure threshold, the pump capacity command section inputs such a pump capacity command as to make the capacity of the first pump 21 be the maximum value of the capacity that the first pump 21 can have, namely, the first maximum capacity. When the first pump pressure exceeds the first pump pressure threshold, the pump capacity command section inputs such a pump capacity command as to make the capacity of the first pump 21 smaller than the first maximum capacity with an increase in the first pump pressure so as to prevent the output of the pump unit 20P from exceeding the horsepower of the engine E. When the driving state is deviated from the allowable range, the load acting on the arm cylinder 45 is higher than that when the driving state is within the allowable range, rendering the head pressure of the arm cylinder 45 high. The execution of the regeneration operation further increases the head pressure. This may cause the first pump pressure to be greater than the above first pump pressure threshold to cause the capacity of the first pump 21 to be reduced by the PQ control. The reduction in the capacity of the first pump 21 may decrease the first pump flow rate to further reduce the speed of the arm cylinder 45 to thereby further slowdown the motion of the work machine 1. In contrast, the regeneration release operation can prevent the first pump pressure from exceeding the first pump pressure threshold to thereby restrain the execution of PQ control from reducing the speed of the arm cylinder 45.

When the driving state of the arm cylinder 45 is deviated from the allowable range in the combined operation state, specifically, when the physical quantity to be the index of the driving state is deviated from an allowable range, the motor capacity command section of the controller 90 generates such a motor capacity command as to maximize the capacity of each of the first and second traveling motors 31 and 32 and inputs the motor capacity command to the first and second traveling motors 31 and 32 (step S23). For example, when the "first speed" corresponding to the maximum capacity and the "second speed" corresponding to the minimum capacity are set as the capacity of each of the first and second traveling motors 31 and 32, the motor capacity command section inputs a motor capacity command for setting the capacity of each of the first and second traveling motors 31 and 32 to "1 speed" to each of the first and second traveling motors 31 and 32. Thus maximizing the capacity of the first and second traveling motors 31 and 32 reduces the rotation speed of the first and second traveling motors 31 and 32 and further the speed of the traveling motions of the pair of crawlers 11*a* as compared with the case where the capacity of each of the first and second traveling motors 31 and 32 is less than the maximum. This restrains the crawlers 11*a* from idly running to shave off the ground (the surface of upward slope). Besides, as will be specifically described, reducing the rotation speed of the first and second traveling motors 31 and 32 can restrains the balance between the rotational motion speed of the arm 15*b* and the traveling speed by the first and second traveling motors 31 and 32 from being lost.

In the control sequence S20, the flow-path switching control unit including the flow-path switching command section of the controller 90 makes the opening area of the throttle 73*d* of the communication flow path 73*c* of the straight traveling valve 70 at the straight traveling position 73 smaller than that in the case where the driving state of the arm cylinder 45 is within the allowable range in the combined operation state, specifically, the case where the physical quantity serving as the index of the driving state is within an allowable range (step S25). This control also includes making the open area zero, that is, blocking the communication flow path 73*c*. Specifically, the flow-path switching control unit limits the pilot pressure to be input to the pilot port 75 of the straight traveling valve 70 to reduce the stroke of the flow-path switching motion of the straight traveling valve 70 from the neutral position 71 to the straight traveling position 73.

The limitation of the opening area of the communication flow path 73*c* reduces (including eliminates) the flow rate of hydraulic fluid supplied from the first pump 21 to the first traveling motor 31. This enables the flow rate of hydraulic fluid that should be supplied from the first pump 21 to the arm cylinder 45 through the first flow path 73*a* to be secured and enables necessary driving pressure of the arm cylinder 45 to be secured, thereby allowing the arm cylinder 45 to be normally driven. Besides, reducing the flow rate of hydraulic fluid to be supplied from the first pump 21 to the first traveling motor 31 reduces the rotation speed of the first and second traveling motors 31 and 32 (the speed of traveling motion) to thereby enable the crawlers 11*a* to be restrained from idly running to the ground. Thus securing the driving pressure of the arm cylinder 45 and reducing the rotation speed of the first and second traveling motors 31 and 320 enables, for example, the movement of the work machine 1 by the above-mentioned pulling-up motion (pulling up) to be easily performed.

The opening area of the communication flow path 73*c* (of the throttle 73*d*) is variously settable. For example, the flow-path switching command section of the controller 90 may set the opening area of the communication flow path 73*c* on the basis of the driving state of the arm cylinder 45. The flow-path switching command section may be configured to reduce the opening area of the communication flow path 73*c* with a decrease in the rotational motion speed of the arm 15*b* (the expansion/contraction speed of the arm cylinder 45), for example, with an increase in the difference between the speed and the speed allowable value. For example, the flow-path switching control unit may be configured to reduce the opening area of the communication flow path 73*c* with an increase in the thrust of the arm cylinder 45 (for example, an increase in the difference between the thrust and the thrust allowable value). Besides, as will be described later, the flow-path switching control unit may set the opening area of the communication flow path 73*c* so as to render the balance between the rotational motion speed of the arm 15*b* and the speed of the traveling motion by the first and second traveling motors 31 and 32 favorable.

As the pump flow rate required in the initial operation, the pump capacity command section of the controller 90 calculates a second pump flow rate, which is the flow rate of hydraulic fluid to be discharged from the second pump 22, on the basis of respective traveling operation amounts which are respective amounts of the travel operations applied to the traveling operation units 171 and 172, respectively (step S31). The flow rate is a required flow rate for the first and second traveling motors 31 and 32 to make the pair of crawlers 11*a* perform the traveling motions at the speed corresponding to the traveling operation amount.

On the other hand, the pump capacity command section of the controller 90 judges whether or not the rotational motion speed of the arm 15*b* is equal to or greater than an initial operation judgment threshold value that is prestored in the controller 90 (step S33). If the rotation speed is less than the initial operation judgment threshold (NO in step S33), the pump capacity command section inputs to the second pump 22 such a pump capacity command as to make the second pump flow rate the flow rate determined on the basis of the traveling operation amount, namely, an initial operation required pump flow rate, regardless of the below-described "upper limit value".

Figure 7:
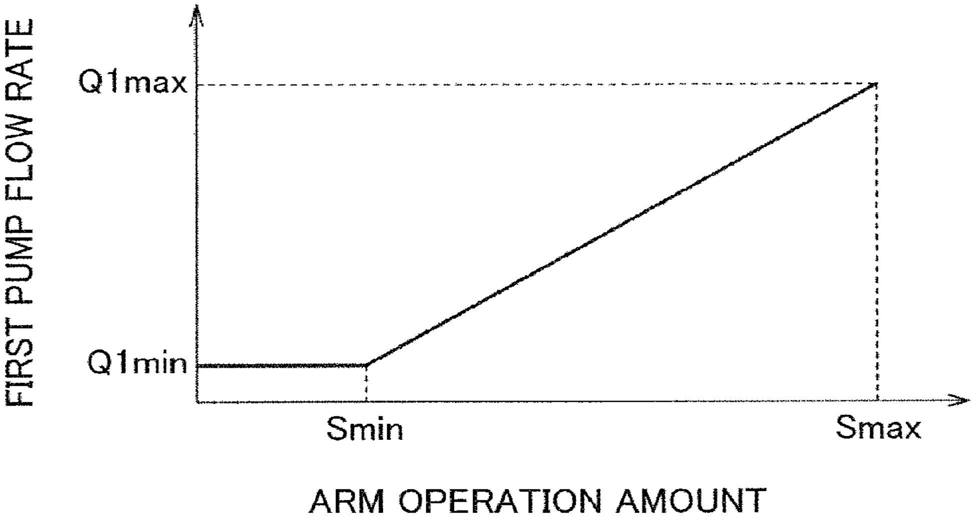
FIG. 7 is a graph showing the relationship between an arm operation amount which is the magnitude of an arm operation and a first pump flow rate that is the flow rate of hydraulic fluid discharged from the first pump 21.
Figure 8:
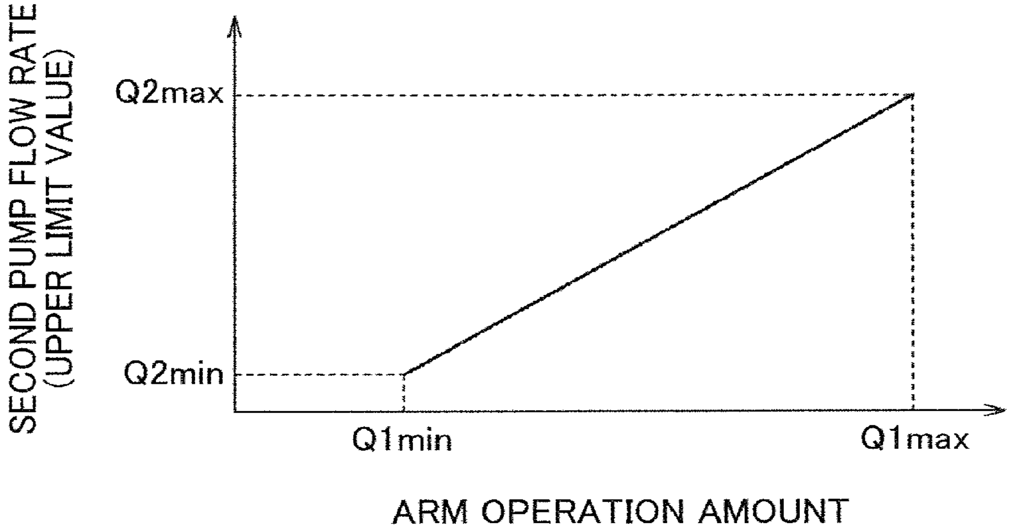
FIG. 8 is a graph showing the relationship between the first pump flow rate and the upper limit value of the second pump flow rate which is the flow rate of hydraulic fluid discharged from the second pump 22.

FIGS. 7 and 8 show a specific example of setting the pump flow rate. The pump capacity command section of the controller 90 stores a first pump flow rate corresponding to the arm operation amount as shown in FIG. 7, and determines the first pump flow rate on the basis of the first pump flow rate. As shown in FIG. 7, the pump capacity command section determines a larger first pump flow rate as the arm operation amount is larger. Specifically, the relationship between the arm operation amount and the first pump flow rate is set such that the first pump flow rate is increased from the minimum flow rate Q1 min to the maximum flow rate Q1max with an increase in the arm operation amount from the minimum operation amount Smin to the maximum operation amount Smax which are shown in FIG. 7. Next, the pump capacity command section sets the upper limit value of the second pump flow rate on the basis of the first pump flow rate. Specifically, the controller 90 stores the upper limit value of the second pump flow rate related to the first pump flow rate, for example, as shown in FIG. 8. In summary, the controller 90 stores the upper limit value of the second pump flow rate such that the second pump flow rate is increased from the minimum value Q2 min to the maximum value Q2max with an increase in the first pump flow rate from the minimum flow rate Q1min to the maximum flow rate Q1max. The pump capacity command section, therefore, sets a larger upper limit for the second pump flow rate as the first pump flow rate is greater (that is, as the assumed rotational motion speed of the arm).

When the rotational motion speed of the arm 15*b* is equal to or greater than the initial operation judgment threshold (YES in step S33), the pump capacity command section of the controller 90 performs such a pump capacity control as to improve the balance between the rotational motion speed of the arm 15*b* and the speed of the traveling motion by the first and second traveling motors 31 and 32. Specifically, the pump capacity command section generates such a pump capacity command as to restrain the rotation speed of each of the first and second traveling motors 31 and 32 from being excessive relatively to the rotational motion speed of the arm 15*b* (e.g., becoming such a speed as to cause the crawlers 11*a* to idly run). The pump capacity command section sets the upper limit value of the pump supply flow rate on the basis of a value relating to the driving state of the arm cylinder 45, for example, the arm rotational motion speed or the arm operation amount (step S35).

Specifically, in the case where the work attachment 15 performs the pulling-up motion, the controller 90 sets the upper limit value of the total flow rate of hydraulic fluid that is discharged from the pump unit 20P to be supplied to the first and second traveling motors 31 and 32 (hereinafter referred to as "pump supply flow rate") so as to satisfy the following [Condition A].

[Condition A] The pump capacity command section sets the upper limit value of the pump supply flow rate so as to put the difference between the first moving speed, which is the speed of the movement of the work machine 1 caused by the arm crowding motion of the arm 15*b*, and the second moving speed, which is the speed of the movement of the work machine 1 caused by the driving of the first and second traveling motors 31 and 32, within a predetermined range. For example, the upper limit value of the pump supply flow rate is set so as to render the first and second moving speeds equal to each other. The first moving speed is the moving speed of the work machine 1 assumed to be provided by the arm crowding motion of the arm 15*b*, not absolutely required to be the actual moving speed of the work machine 1. The second moving speed is the moving speed of the work machine 1 assumed to be provided by the driving of the first and second traveling motors 31 and 32, not absolutely required to be the actual moving speed of the actual work machine 1.

For example, the controller 90 stores a relationship between a value related to the arm crowding motion of the arm 15*b* and the pump supply flow rate. The "value related to the arm crowding motion of the arm 15*b*" may be, for example, either the actual rotational motion speed of the arm 15*b* (e.g., the speed detected by the speed sensor 87) or the arm crowding operation amount.

The "pump supply flow rate" includes the flow rate of hydraulic fluid supplied from at least the second pump 22 to the first and second traveling motors 31 and 32. When the communication flow path 73*c* is blocked, the "pump supply flow rate" is the flow rate of hydraulic fluid supplied from the second pump 22 to the first and second traveling motors 31 and 32. In the state where the communication flow path 73*c* is opened, the "pump supply flow rate" is the total flow rate of hydraulic fluid supplied from the first pump 21 and the second pump 22 to the first and second traveling motors 31 and 32.

The pump capacity command section sets (determines) the pump supply flow rate corresponding to the traveling operation amount, within the range not greater than the upper limit value of the pump supply flow rate (step S37). When a large traveling operation corresponding to a pump supply flow rate larger than the upper limit value is performed, the controller 90 determines the pump supply flow rate on the basis of the upper limit value, regardless of the traveling operation. The pump capacity setting unit generates a pump capacity command for providing the thus determined pump supply flow rate and inputs the pump capacity command to the first pump 21 and the second pump 22.

Satisfying the above [Condition A] when the arm 15*b* is stopped or substantially stopped, that is, when the arm rotational motion speed, which is the target motion speed, is 0 or close to zero, would require the first and second traveling motors 31 and 32 to be stopped or substantially stopped, which renders the actual traveling of the work machine 1 difficult. For this reason, when the rotational motion speed of the arm 15*b* is equal to or less than the initial operation judgment threshold, the pump capacity command section of the controller 90 determines the flow rate of the hydraulic fluid to be supplied from the pump unit 20*p* to the first and second traveling motors 31 and 32 on the basis of the traveling operation amount, regardless of the upper limit value (step S31). This allows an operator to make the first and second traveling motors 31 and 32 actuated to cause the work machine 1 to travel by application of a traveling operation to each of the first and second traveling operation units 171 and 172.

The above embodiments may be variously modified. For example, the connection of the circuit shown in FIGS. 2, 3 and 4 may be modified. For example, the order of the steps of the flowchart shown in FIG. 5 may be changed, and a part of the steps is omittable. For example, the allowable values, ranges, and the like may be constant, may be changed by manual operation, and may be automatically changed in accordance with some conditions. For example, the number of components may be changed and some of the components may not be provided. For example, what has been described as a plurality of members or portions that are different from each other may be configured to be one member or a portion. For example, what has been described as one member or portion may be divided into a plurality of members or parts that are different from each other.

While the speed allowable value in the embodiment is changed on the basis of both the target work operation amount and the pump flow rate in the embodiment, it may either be changed on the basis of only the target work operation amount or be constant (fixed value). The speed allowable value only has to be a value that renders it judgeable whether or not the target work motion of the work attachment corresponds to the target work operation. The thrust allowable value also may be variously changed within a range satisfying similar conditions.

The position of the regeneration selector valve 62 or the position of each of the regeneration valve 63 and the regeneration release valve 65 is not limited to the positions shown in FIGS. 2 to 4. For example, the position may be set so as to locate the arm control valve 55 in the middle of a flow path between the regeneration selector valve 62 or the pair of the regeneration valve 63 and the regeneration release valve 65 and the arm cylinder 45.

As described above, there is provided a hydraulic control apparatus that includes a flow-path selector valve and is provided in a work machine, the hydraulic control apparatus being capable of reducing a sudden drop in traveling speed during the shift from a single operation state to a combined operation state while securing necessary driving pressure of a work actuator in the combined operation state and restraining the traveling speed from excessive increase.

Provided is a hydraulic control apparatus to be provided in a work machine that includes a first traveling body and a second traveling body, which are provided on the left and right and capable of performing respective traveling motions, and a work attachment capable of performing a work motion, the hydraulic control apparatus including: a first pump that discharges hydraulic fluid; a second pump that is separately provided from the first pump and discharges hydraulic fluid; a first traveling motor that is driven by supply of hydraulic fluid to make the first traveling body perform the traveling motion; a second traveling motor that is driven by supply of hydraulic fluid to make the second traveling body perform the traveling motion; a work actuator that is driven by supply of hydraulic fluid to make the work attachment perform a target work motion included in the work motion; a flow-path selector valve capable of making a flow-path switching motion for switching a flow path of hydraulic fluid discharged by the first pump and the second pump, the flow-path switching motion being a motion of being shifted between a first position for forming a flow path for allowing hydraulic fluid discharged from the first pump to be supplied to the first traveling motor and allowing hydraulic fluid discharged from the second pump to be supplied to the second traveling motor and the work actuator without being supplied to the first traveling motor and a second position for forming a first flow path for allowing hydraulic fluid discharged from the first pump to be supplied to the work actuator and a second flow path for allowing hydraulic fluid discharged from the second pump to be supplied to the first traveling motor and the second traveling motor and forming a communication flow path providing communication between the first flow path and the second flow path, the communication flow path having an opening area that is variable by the flow-path switching motion; a driving state detector that detects a physical quantity which is an index of a driving state of the work actuator and varied with a variation in the load of the work actuator; and a flow-path switching control unit that makes the flow-path selector valve perform the flow-path switching motion, the flow-path switching control unit configured to shift the flow-path selector valve to the first position in a single operation state where only one of a target work operation that is an operation for making the work attachment perform the target work motion and a traveling operation that is an operation for making the first traveling motor and the second traveling motor perform the respective traveling motions and to shift the flow-path selector valve to the second position in a combined operation state where the target work operation and the traveling operation are simultaneously performed. The flow-path switching control unit stores an allowable range of the physical quantity, the allowable range set in correspondence with a target work operation amount which is a magnitude of the target work operation, and operates the flow-path selector valve so as to make the opening area of the communication flow path smaller in a case where the physical quantity detected by the driving state detector in the combined operation state is deviated from the allowable range corresponding to the target work operation amount than that in a case where the detected physical quantity is within the allowable range.

According to the hydraulic control apparatus, when the flow-path selector valve is shifted from the first position to the second position in accordance with the shift from the single operation state to the combined operation state, the communication flow path provides communication between the first flow path and the second flow path which are formed at the second position, thereby enabling the first and second traveling motors to be restrained from being suddenly decelerated. In addition, the flow-path switching control unit, which makes the opening area of the communication flow path smaller in the case where the physical quantity which is the index of the driving state of the work actuator and is varied in response to the variation in the load of the work actuator is deviated from the allowable range than that in the case where the physical quantity is within the allowable range, can reduce the flow rate of hydraulic fluid flowing from the first pump to the first traveling motor through the first flow path, the communication flow path and the second flow path. This enables the flow rate of hydraulic fluid supplied from the first pump to the work actuator and further the driving pressure thereof to be secured in spite of the large load applied to the work actuator, and restrains the driving speed of the first and second traveling motors from excessive increase. This makes it possible, for example, to restrain the first and second traveling bodies from idly running due to excessive increase in the speed thereof while moving the work actuator against a high load.

It is preferable that the driving state detector is a speed detector that detects a work motion speed, which is a speed of the target work motion, as the physical quantity to be the index of the driving state, and that the flow-path switching control unit stores a preset speed allowable value in correspondence with the target work operation amount and makes the opening area of the communication flow path smaller in the case where the target work motion speed detected by the speed detector is equal to or less than the speed allowable value corresponding to the target work operation amount than that in the case where the target work motion speed is greater than the speed allowable value. The speed detector, which detects the motion speed of the target work, enables the driving state of the work actuator to be accurately judged. Specifically, in the case where the target work motion speed is equal to or less than the speed allowable value corresponding to the target work operation amount, that is, in the case where the load applied to the work actuator is so excessive as to hinder the target work operation amount and the actual work motion speed from properly corresponding to each other, the flow-path switching control unit reduces the opening area of the communication flow path to restrain hydraulic fluid from the first pump from flowing into the first traveling motor, thereby assisting the driving pressure of the work actuator to be secured.

In this mode, the flow-path switching control unit is preferably configured to set a larger speed allowable value, as the speed allowable value corresponding to the target work operation amount, as the flow rate of hydraulic fluid discharged by the first pump is larger. Since the target work motion speed is increased with an increase in the flow rate of hydraulic fluid supplied to the work actuator, the flow-path switching control unit can appropriately judge the driving state of the work actuator based on the speed allowable value which is increased with an increase in the flow rate of hydraulic fluid discharged by the first pump.

The driving state detector, alternatively, may be a thrust detector that detects an actuator thrust, which is a thrust of the work actuator, as the physical quantity to be the index of the driving state. The actuator thrust also allows the driving state to be accurately judged. The actuator thrust can be calculated, for example, based on the hydraulic pressure applied to the work actuator. In the case where the physical quantity is thus the actuator thrust, it is preferable that the flow-path switching control unit stores a thrust allowable value that is preset in correspondence with the target work operation amount and makes the opening area of the communication flow path smaller in the case where the actuator thrust detected by the driving state detector is equal to or greater than the thrust allowable value corresponding to the target work operation amount than the opening area in the case where the actuator thrust is less than the thrust allowable value. The flow-path switching control unit, thus reducing the opening area of the communication flow path to restrain hydraulic fluid from the first pump from flowing into the first traveling motor when the actuator thrust is equal to or greater than the thrust allowable value corresponding to the target work operation amount, that is, when a thrust larger than the thrust corresponding to the target work operation amount is caused by the excessive load applied to the work actuator, can assist the driving pressure of the work actuator to be secured.

Preferably, the hydraulic control apparatus further includes: a regeneration valve provided in a regeneration flow path for merging discharge hydraulic fluid that is discharged from the work actuator into supply hydraulic fluid that is to be supplied to the work actuator, the regeneration valve being shiftable between an opening state of opening the regeneration flow path and a closing state of blocking the regeneration flow path; a regeneration release valve provided in a return flow path allowing the discharge hydraulic fluid to be returned to a tank without merging into the supply hydraulic fluid, the regeneration release valve being shiftable between an opening state of opening the return flow path and a closing state of blocking the return flow path; and a regeneration control unit. The regeneration control unit is configured to shift the regeneration valve to the opening state and shift the regeneration release valve to the closing state when the physical quantity detected by the driving state detector in the combined operation state is within the allowable range, and configured to shift the regeneration valve to the closing state and shift the regeneration release valve to the opening state when the physical quantity detected by the driving state detector in the combined operation state is deviated from the allowable range.

The regeneration control unit, thus shifting the regeneration valve to the closing state and shifting the regeneration release valve to the opening state when the physical quantity to be the index of the driving state is deviated from the allowable range in the combined operation state, allows the pressure of discharge hydraulic fluid discharged from the work actuator to become close to the pressure in the tank, thereby enabling the thrust of the work actuator to be increased to allow the work actuator to easily make the work attachment perform the target work motion.

In the case where the target work motion is a motion capable of moving the work machine in a traveling direction in which the work machine is moved by the traveling motions of the first traveling body and the second traveling body, the flow-path switching control unit is, preferably, configured to set an upper limit value of the flow rate of hydraulic fluid to be supplied to the first traveling motor and the second traveling motor from both the first pump and the second pump so as to put the difference between a traveling speed of the work machine in the travel direction by the target work motion and a traveling speed of the work machine in the travel direction by the traveling operation of each of the first traveling body and the second traveling body within a predetermined range.

Setting the upper limit value, the flow-path switching control unit assists the difference between the moving speed of the work machine by the target work motion and the moving speed of the work machine by the traveling motion to fall within the predetermined range (i.e., enables an excellent speed balance to be kept). This assists the work actuator and the first and second traveling motors to move the work machine in cooperation with each other. For example, such a trouble can be restrained from occurring that the first and second traveling motors are driven in a state where the work attachment can hardly perform a specific work motion against an excessive load to thereby bring the first and second traveling bodies into idly running. Besides, it is possible to restrain the difference between the driving pressure of the work actuator and the driving pressure of the first and second traveling motors from being increased to thereby prevent these driving pressures from being increased beyond necessity.

In addition, setting the "upper limit value" of the flow rate of hydraulic fluid to be supplied to the first and second traveling motors from the second pump allows the flow rate of hydraulic fluid discharged from the second pump to be set in accordance with the traveling operation when the traveling operation is performed such that the flow rate is smaller than the "upper limit value", thereby rendering the traveling operation effective.

Preferably, the flow-path switching control unit is configured to determine the flow rate of hydraulic fluid to be supplied to the first and second traveling motors from both the first pump and the second pump on the basis of a traveling operation amount which is a magnitude of the traveling operation, regardless of the upper limit value, when the speed of the target work motion is equal to or less than a preset speed threshold (for example, an initial operation judgment threshold). The setting of the speed threshold allows the first and second traveling motors to be driven on the basis of the traveling operation when the speed of the target work motion is less than or equal to the speed threshold, thereby enabling the work machine to travel even when the target work motion speed is low.

Each of the first traveling motor and the second traveling motor may be composed of a variable displacement hydraulic motor. In this mode, it is preferable that the hydraulic control apparatus further includes a motor capacity command section that changes a capacity of each of the first and second traveling motors, and the motor capacity command section is configured to maximize the capacity of each of the first and second traveling motors when the physical quantity detected by the driving state detector in the combined operation state is deviated from the allowable range. The motor capacity command section, thus maximizing the capacity of each of the first and second traveling motors to increase the torque of the first and second traveling motors while reduces the speed thereof when the driving state is unallowable, thereby enabling the first and second traveling bodies to be more reliably restrained from idly running.

The invention claimed is:

1. A hydraulic control apparatus to be provided in a work machine that includes a first traveling body and a second traveling body, which are provided on left and right of the work machine and configured to perform respective traveling motions, and a work attachment configured to perform a work motion, the hydraulic control apparatus comprising:

a first pump that discharges hydraulic fluid;

a second pump that is separately provided from the first pump and discharges the hydraulic fluid;

a first traveling motor that is driven by supply of the hydraulic fluid to make the first traveling body perform the traveling motion;

a second traveling motor that is driven by supply of the hydraulic fluid to make the second traveling body perform the traveling motion;

a work actuator that is driven by supply of the hydraulic fluid to make the work attachment perform a target work motion included in the work motion;

a flow-path selector valve configured to make a flow-path switching motion for switching a flow path of the hydraulic fluid discharged by the first pump and the second pump, the flow-path switching motion shifted between a first position for forming the flow path for allowing the hydraulic fluid discharged from the first pump to be supplied to the first traveling motor and allowing the hydraulic fluid discharged from the second pump to be supplied to the second traveling motor and the work actuator without being supplied to the first traveling motor, and a second position for forming a first flow path for allowing the hydraulic fluid discharged from the first pump to be supplied to the work actuator and a second flow path for allowing the hydraulic fluid discharged from the second pump to be supplied to the first traveling motor and the second traveling motor and forming a communication flow path providing communication between the first flow path and the second flow path, the communication flow path having an opening area variable by the flow-path switching motion;

a driving state detector that detects a physical quantity which is an index of a driving state of the work actuator and varied with a variation in a load of the work actuator; and a flow-path switching control unit that makes the flow-path selector valve perform the flow-path switching motion, the flow-path switching control unit configured to shift the flow-path selector valve to the first position in a single operation state where only one of a target work operation that is an operation for making the work attachment perform the target work motion and a traveling operation that is an operation for making the first traveling motor and the second traveling motor perform the respective traveling motions, and shift the flow-path selector valve to the second position in a combined operation state where the target work operation and the traveling operation are simultaneously performed, wherein the physical quantity is selected from a target work motion speed which is a speed of the target work motion and an actuator thrust which is a thrust of the work actuator, and the flow-path switching control unit stores an allowable range of the physical quantity, the allowable range being set in correspondence with a target work operation amount which is a magnitude of the target work operation, and operates the flow-path selector valve so as to make the opening area of the communication flow path smaller, in a case where the physical quantity detected by the driving state detector in the combined operation state is deviated from the allowable range corresponding to the target work operation amount, than the opening area in a case where the detected physical quantity is within the allowable range.

2. The hydraulic control apparatus according to claim 1, further comprising:

a regeneration valve provided in a regeneration flow path for merging a discharge hydraulic fluid that is discharged from the work actuator into a supply hydraulic fluid that is to be supplied to the work actuator, the regeneration valve being shiftable between an opening state of opening the regeneration flow path and a closing state of blocking the regeneration flow path;

a regeneration release valve provided in a return flow path allowing the discharge hydraulic fluid to be returned to a tank without merging into the supply hydraulic fluid, the regeneration release valve being shiftable between an opening state of opening the return flow path and a closing state of blocking the return flow path; and a regeneration control unit configured to shift the regeneration valve to the opening state and shift the regeneration release valve to the closing state when the physical quantity detected by the driving state detector in the combined operation state is within the allowable range, and shift the regeneration valve to the closing state and shift the regeneration release valve to the opening state when the physical quantity detected by the driving state detector in the combined operation state is deviated from the allowable range.

3. The hydraulic control apparatus according to claim 1, wherein the target work motion is a motion configured to move the work machine in a traveling direction in which the work machine is moved by the traveling motions of the first traveling body and the second traveling body, and the flow-path switching control unit is configured to set an upper limit value of a flow rate of the hydraulic fluid to be supplied to the first traveling motor and the second traveling motor from both the first pump and the second pump so as to put a difference between a traveling speed of the work machine in the travel direction by the target work motion and a traveling speed of the work machine in the travel direction by the traveling operations of the first traveling body and the second traveling body within a predetermined range.

4. The hydraulic control apparatus according to claim 3, wherein the flow-path switching control unit is configured to determine the flow rate of hydraulic fluid to be supplied to the first and second traveling motors from both the first pump and the second pump on the basis of a traveling operation amount which is a magnitude of the traveling operation, regardless of the upper limit value, when the speed of the target work motion is equal to or less than a preset speed threshold.

5. The hydraulic control apparatus according to claim 1, wherein each of the first traveling motor and the second traveling motor is composed of a variable displacement hydraulic motor, the hydraulic control apparatus further comprising a motor capacity command section that changes a capacity of each of the first traveling motor and the second traveling motor, the motor capacity command section being configured to maximize the capacity of each of the first traveling motor and the second traveling motor when the physical quantity detected by the driving state detector in the combined operation state is deviated from the allowable range.

6. A hydraulic control apparatus to be provided in a work machine that includes a first traveling body and a second traveling body, which are provided on the left and right and configured to perform respective traveling motions, and a work attachment configured to perform a work motion, the hydraulic control apparatus comprising:

a first pump that discharges hydraulic fluid;

a second pump that is separately provided from the first pump and discharges hydraulic fluid:

a first traveling motor that is driven by supply of hydraulic fluid to make the first traveling body perform the traveling motion;

a second traveling motor that is driven by supply of hydraulic fluid to make the second traveling body perform the traveling motion;

a work actuator that is driven by supply of hydraulic fluid to make the work attachment perform a target work motion included in the work motion;

a flow-path selector valve configured to make a flow-path switching motion for switching a flow path of hydraulic fluid discharged by the first pump and the second pump, the flow-path switching motion being a motion of being shifted between a first position for forming a flow path for allowing hydraulic fluid discharged from the first pump to be supplied to the first traveling motor and allowing hydraulic fluid discharged from the second pump to be supplied to the second traveling motor and the work actuator without being supplied to the first traveling motor and a second position for forming a first flow path for allowing hydraulic fluid discharged from the first pump to be supplied to the work actuator and a second flow path for allowing hydraulic fluid discharged from the second pump to be supplied to the first traveling motor and the second traveling motor and forming a communication flow path providing communication between the first flow path and the second flow path, the communication flow path having an opening area variable by the flow-path switching motion;

a driving state detector that detects a physical quantity which is an index of a driving state of the work actuator and varied with a variation in the load of the work actuator; and a flow-path switching control unit that makes the flow-path selector valve perform the flow-path switching motion, the flow-path switching control unit configured to shift the flow-path selector valve to the first position in a single operation state where only one of a target work operation that is an operation for making the work attachment perform the target work motion and a traveling operation that is an operation for making the first traveling motor and the second traveling motor perform the respective traveling motions and configured to shift the flow-path selector valve to the second position in a combined operation state where the target work operation and the traveling operation are simultaneously performed, wherein the flow-path switching control unit stores an allowable range of the physical quantity, the allowable range being set in correspondence with a target work operation amount which is a magnitude of the target work operation, and operates the flow-path selector valve so as to make the opening area of the communication flow path smaller in a case where the physical quantity detected by the driving state detector in the combined operation state is deviated from the allowable range corresponding to the target work operation amount than the opening area in a case where the detected physical quantity is within the allowable range, the driving state detector is a speed detector that detects a target work motion speed which is a speed of the target work motion, as the physical quantity to be the index of the driving state, and the flow-path switching control unit stores a speed allowable value that is preset in correspondence with the target work operation amount, and makes the opening area of the communication flow path smaller, in a case where the target work motion speed detected by the speed detector is equal to or less than the speed allowable value corresponding to the target work operation amount, than that in a case where the target work motion speed is greater than the speed allowable value.

7. The hydraulic control apparatus according to claim 6, wherein the flow-path switching control unit sets a larger speed allowable value, as the speed allowable value corresponding to the target work operation amount, as a flow rate of the hydraulic fluid discharged by the first pump becomes larger.

8. The hydraulic control apparatus according to claim 2, further comprising:

a regeneration valve provided in a regeneration flow path for merging discharge hydraulic fluid that is discharged from the work actuator into supply hydraulic fluid that is to be supplied to the work actuator, the regeneration valve being shiftable between an opening state of opening the regeneration flow path and a closing state of blocking the regeneration flow path;

a regeneration release valve provided in a return flow path allowing the discharge hydraulic fluid to be returned to a tank without merging into the supply hydraulic fluid, the regeneration release valve being shiftable between an opening state of opening the return flow path and a closing state of blocking the return flow path; and a regeneration control unit configured to shift the regeneration valve to the opening state and shift the regeneration release valve to the closing state when the physical quantity detected by the driving state detector in the combined operation state is within the allowable range, and shift the regeneration valve to the closing state and shift the regeneration release valve to the opening state when the physical quantity detected by the driving state detector in the combined operation state is deviated from the allowable range.

9. The hydraulic control apparatus according to claim 2, wherein the target work motion is a motion configured to move the work machine in a traveling direction in which the work machine is moved by the traveling motions of the first traveling body and the second traveling body, and the flow-path switching control unit is configured to set an upper limit value of the flow rate of hydraulic fluid to be supplied to the first traveling motor and the second traveling motor from both the first pump and the second pump so as to put the difference between a traveling speed of the work machine in the travel direction by the target work motion and a traveling speed of the work machine in the travel direction by the traveling operations of the first traveling body and the second traveling body within a predetermined range.

10. The hydraulic control apparatus according to claim 9, wherein the flow-path switching control unit is configured to determine the flow rate of hydraulic fluid to be supplied to the first and second traveling motors from both the first pump and the second pump on the basis of a traveling operation amount which is a magnitude of the traveling operation, regardless of the upper limit value, when the speed of the target work motion is equal to or less than a preset speed threshold.

11. The hydraulic control apparatus according to claim 6, wherein each of the first traveling motor and the second traveling motor is composed of a variable displacement hydraulic motor, the hydraulic control apparatus further comprising a motor capacity command section that changes a capacity of each of the first and second traveling motors, the motor capacity command section being configured to maximize the capacity of each of the first and second traveling motors when the physical quantity detected by the driving state detector in the combined operation state is deviated from the allowable range.

12. A hydraulic control apparatus to be provided in a work machine that includes a first traveling body and a second traveling body, which are provided on the left and right and configured to perform respective traveling motions, and a work attachment configured to perform a work motion, the hydraulic control apparatus comprising:

a first pump that discharges hydraulic fluid;

a second pump that is separately provided from the first pump and discharges hydraulic fluid:

a first traveling motor that is driven by supply of hydraulic fluid to make the first traveling body perform the traveling motion;

a second traveling motor that is driven by supply of hydraulic fluid to make the second traveling body perform the traveling motion;

a work actuator that is driven by supply of hydraulic fluid to make the work attachment perform a target work motion included in the work motion;

a flow-path selector valve configured to make a flow-path switching motion for switching a flow path of hydraulic fluid discharged by the first pump and the second pump, the flow-path switching motion being a motion of being shifted between a first position for forming a flow path for allowing hydraulic fluid discharged from the first pump to be supplied to the first traveling motor and allowing hydraulic fluid discharged from the second pump to be supplied to the second traveling motor and the work actuator without being supplied to the first traveling motor and a second position for forming a first flow path for allowing hydraulic fluid discharged from the first pump to be supplied to the work actuator and a second flow path for allowing hydraulic fluid discharged from the second pump to be supplied to the first traveling motor and the second traveling motor and forming a communication flow path providing communication between the first flow path and the second flow path, the communication flow path having an opening area variable by the flow-path switching motion;

a driving state detector that detects a physical quantity which is an index of a driving state of the work actuator and varied with a variation in the load of the work actuator; and a flow-path switching control unit that makes the flow-path selector valve perform the flow-path switching motion, the flow-path switching control unit configured to shift the flow-path selector valve to the first position in a single operation state where only one of a target work operation that is an operation for making the work attachment perform the target work motion and a traveling operation that is an operation for making the first traveling motor and the second traveling motor perform the respective traveling motions and configured to shift the flow-path selector valve to the second position in a combined operation state where the target work operation and the traveling operation are simultaneously performed, wherein the flow-path switching control unit stores an allowable range of the physical quantity, the allowable range being set in correspondence with a target work operation amount which is a magnitude of the target work operation, and operates the flow-path selector valve so as to make the opening area of the communication flow path smaller in a case where the physical quantity detected by the driving state detector in the combined operation state is deviated from the allowable range corresponding to the target work operation amount than the opening area in a case where the detected physical quantity is within the allowable range, the driving state detector detects an actuator thrust that is a thrust of the work actuator, as the physical quantity to be the index of the driving state, and the flow-path switching control unit stores a thrust allowable value that is preset in correspondence with the target work operation amount, and makes the opening area of the communication flow path smaller, in a case where the actuator thrust detected by the driving state detector is equal to or greater than the thrust allowable value corresponding to the target work operation amount, than the opening area in a case where the actuator thrust is less than the thrust allowable value.

13. The hydraulic control apparatus according to claim 12, further comprising:

a regeneration valve provided in a regeneration flow path for merging discharge hydraulic fluid that is discharged from the work actuator into supply hydraulic fluid that is to be supplied to the work actuator, the regeneration valve being shiftable between an opening state of opening the regeneration flow path and a closing state of blocking the regeneration flow path;

a regeneration release valve provided in a return flow path allowing the discharge hydraulic fluid to be returned to a tank without merging into the supply hydraulic fluid, the regeneration release valve being shiftable between an opening state of opening the return flow path and a closing state of blocking the return flow path; and a regeneration control unit configured to shift the regeneration valve to the opening state and shift the regeneration release valve to the closing state when the physical quantity detected by the driving state detector in the combined operation state is within the allowable range, and shift the regeneration valve to the closing state and shift the regeneration release valve to the opening state when the physical quantity detected by the driving state detector in the combined operation state is deviated from the allowable range.

14. The hydraulic control apparatus according to claim 12 wherein each of the first traveling motor and the second traveling motor is composed of a variable displacement hydraulic motor, the hydraulic control apparatus further comprising a motor capacity command section that changes a capacity of each of the first and second traveling motors, the motor capacity command section being configured to maximize the capacity of each of the first and second traveling motors when the physical quantity detected by the driving state detector in the combined operation state is deviated from the allowable range.

15. The hydraulic control apparatus according to claim 12, wherein the target work motion is a motion configured to move the work machine in a traveling direction in which the work machine is moved by the traveling motions of the first traveling body and the second traveling body, and the flow-path switching control unit is configured to set an upper limit value of the flow rate of hydraulic fluid to be supplied to the first traveling motor and the second traveling motor from both the first pump and the second pump so as to put the difference between a traveling speed of the work machine in the travel direction by the target work motion and a traveling speed of the work machine in the travel direction by the traveling operations of the first traveling body and the second traveling body within a predetermined range.

16. The hydraulic control apparatus according to claim 15, wherein the flow-path switching control unit is configured to determine the flow rate of hydraulic fluid to be supplied to the first and second traveling motors from both the first pump and the second pump on the basis of a traveling operation amount which is a magnitude of the traveling operation, regardless of the upper limit value, when the speed of the target work motion is equal to or less than a preset speed threshold.

* * * * *